United States Patent
Ryu et al.

(10) Patent No.: US 11,540,241 B2
(45) Date of Patent: *Dec. 27, 2022

(54) METHOD AND APPARATUS FOR TRANSMITTING/RECEIVING SYNCHRONIZATION SIGNAL IN DEVICE-TO-DEVICE COMMUNICATION SYSTEM

(71) Applicant: Samsung Electronics Co., Ltd., Suwon-si (KR)

(72) Inventors: Hyunseok Ryu, Yongin-si (KR); Peng Xue, Hwaseong-si (KR); Seunghoon Park, Seoul (KR); Sangwon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 108 days.

This patent is subject to a terminal disclaimer.

(21) Appl. No.: 17/154,446

(22) Filed: Jan. 21, 2021

(65) Prior Publication Data

US 2021/0144665 A1    May 13, 2021

Related U.S. Application Data

(63) Continuation of application No. 16/728,613, filed on Dec. 27, 2019, now Pat. No. 10,925,025, which is a
(Continued)

(51) Int. Cl.
*H04W 56/00* (2009.01)
*H04W 76/14* (2018.01)
(Continued)

(52) U.S. Cl.
CPC ..... *H04W 56/0015* (2013.01); *H04W 72/042* (2013.01); *H04W 72/0446* (2013.01); *H04W 72/1289* (2013.01); *H04W 76/14* (2018.02)

(58) Field of Classification Search
CPC ............. H04W 56/0015; H04W 76/14; H04W 72/042; H04W 72/0446; H04W 72/1289
(Continued)

(56) References Cited

U.S. PATENT DOCUMENTS 6,487,183 B1   11/2002   Lo et al.
8,213,360 B2   7/2012   Koskela et al.
(Continued)

FOREIGN PATENT DOCUMENTS

CN   102714584 A   10/2012
CN   103188742 A   7/2013
(Continued)

OTHER PUBLICATIONS

Samsung, Nokia, NSN, Intel, WF Triggering Conditions D2DSS Transmission, 3GPP TSG RAN WG1 #77, R1-142661, May 22, 2014.
(Continued)

*Primary Examiner* — Peter G Solinsky
(74) *Attorney, Agent, or Firm* — Jefferson IP Law, LLP

(57) ABSTRACT

The present disclosure relates to a pre-5G or 5G communication system to be provided for supporting higher data rates beyond 4G communication system such as LTE. A method of transmitting a synchronization signal for device-to-device (D2D) communication in an asynchronous network is provided. The method includes transmitting, at the first cell, a system information block (SIB) including resource allocation information of a first cell and at least one neighboring cell, determining whether a first terminal is in a first mode and whether the first terminal is scheduled to perform one of a D2D communication and a D2D discovery, determining, when the first terminal is in the first mode, whether the first terminal is required to transmit a D2D synchronization signal (D2DSS), and transmitting, when the first terminal is
(Continued)

required to transmit the D2DSS, scheduling information including a transmission time point and transmission reference timing information to the first terminal.

14 Claims, 22 Drawing Sheets

Related U.S. Application Data continuation of application No. 16/288,845, filed on Feb. 28, 2019, now Pat. No. 10,531,414, which is a continuation of application No. 14/818,573, filed on Aug. 5, 2015, now Pat. No. 10,225,810.

(60) Provisional application No. 62/076,156, filed on Nov. 6, 2014, provisional application No. 62/055,232, filed on Sep. 25, 2014, provisional application No. 62/033,798, filed on Aug. 6, 2014.

(51) Int. Cl.
　　*H04W 72/04*　　　(2009.01)
　　*H04W 72/12*　　　(2009.01)

(58) Field of Classification Search
　　USPC ......................................................... 370/350
　　See application file for complete search history.

(56) References Cited

U.S. PATENT DOCUMENTS

| | | | |
|---|---|---|---|
| 10,225,810 B2 | 3/2019 | Ryu et al. | |
| 10,531,414 B2 | 1/2020 | Ryu et al. | |
| 10,805,891 B2 | 10/2020 | Park et al. | |
| 10,925,025 B2* | 2/2021 | Ryu | H04W 72/0446 |
| 2006/0049976 A1 | 3/2006 | McFarland | |
| 2007/0155377 A1 | 7/2007 | Horiguchi et al. | |
| 2009/0017851 A1 | 1/2009 | Li et al. | |
| 2009/0323648 A1 | 12/2009 | Park et al. | |
| 2010/0050036 A1 | 2/2010 | Chun et al. | |
| 2010/0081443 A1 | 4/2010 | Meyer et al. | |
| 2010/0177757 A1 | 7/2010 | Kim et al. | |
| 2010/0220679 A1 | 9/2010 | Abraham et al. | |
| 2010/0261469 A1 | 10/2010 | Ribeiro et al. | |
| 2011/0165906 A1 | 7/2011 | Papasakellariou et al. | |
| 2011/0219281 A1 | 9/2011 | Wang et al. | |
| 2012/0163252 A1 | 6/2012 | Ahn et al. | |
| 2012/0188897 A1 | 7/2012 | Shen | |
| 2012/0269178 A1 | 10/2012 | Li et al. | |
| 2012/0281566 A1 | 11/2012 | Pelletier et al. | |
| 2013/0077599 A1 | 3/2013 | Dimou et al. | |
| 2013/0150061 A1 | 6/2013 | Shin et al. | |
| 2013/0155962 A1 | 6/2013 | Hakola et al. | |
| 2013/0178221 A1 | 7/2013 | Jung et al. | |
| 2013/0182626 A1 | 7/2013 | Kuo | |
| 2013/0308551 A1 | 11/2013 | Madan et al. | |
| 2013/0315180 A1 | 11/2013 | Papasakellariou et al. | |
| 2013/0322413 A1 | 12/2013 | Pelletier et al. | |
| 2013/0343273 A1 | 12/2013 | Barbieri et al. | |
| 2014/0003262 A1 | 1/2014 | He et al. | |
| 2014/0011534 A1 | 1/2014 | Dimou | |
| 2014/0022961 A1 | 1/2014 | Park et al. | |
| 2014/0056220 A1 | 2/2014 | Poitau et al. | |
| 2014/0064135 A1 | 3/2014 | Chen | |
| 2014/0082205 A1 | 3/2014 | Abraham et al. | |
| 2014/0112162 A1 | 4/2014 | Tavildar et al. | |
| 2014/0112194 A1 | 4/2014 | Novlan et al. | |
| 2014/0112332 A1 | 4/2014 | Park et al. | |
| 2014/0126403 A1 | 5/2014 | Siomina | |
| 2014/0141789 A1 | 5/2014 | Tarokh et al. | |
| 2014/0161095 A1 | 6/2014 | Nan et al. | |
| 2014/0162714 A1 | 6/2014 | Kim et al. | |
| 2014/0233476 A1 | 8/2014 | Kwak et al. | |
| 2014/0242995 A1 | 8/2014 | Lee et al. | |
| 2014/0254429 A1 | 9/2014 | Wang et al. | |
| 2014/0293809 A1 | 10/2014 | Kim et al. | |
| 2014/0301228 A1 | 10/2014 | Kwak et al. | |
| 2014/0302784 A1 | 10/2014 | Kim et al. | |
| 2015/0005011 A1 | 1/2015 | Nehrenz et al. | |
| 2015/0018017 A1 | 1/2015 | Jang et al. | |
| 2015/0043398 A1 | 2/2015 | Fwu et al. | |
| 2015/0071272 A1 | 3/2015 | Vermani et al. | |
| 2015/0112924 A1 | 4/2015 | Vanturennout et al. | |
| 2015/0117375 A1 | 4/2015 | Sartori et al. | |
| 2015/0181546 A1 | 6/2015 | Freda et al. | |
| 2015/0215883 A1 | 7/2015 | Zheng et al. | |
| 2015/0215903 A1 | 7/2015 | Zhao et al. | |
| 2015/0245383 A1 | 8/2015 | Seo et al. | |
| 2015/0264677 A1 | 9/2015 | He et al. | |
| 2015/0271752 A1 | 9/2015 | Lee et al. | |
| 2015/0326537 A1 | 11/2015 | Cheng et al. | |
| 2015/0327155 A1 | 11/2015 | Lee et al. | |
| 2015/0327195 A1* | 11/2015 | Chiu | H04B 7/15507 370/350 |
| 2015/0327201 A1* | 11/2015 | He | H04W 48/16 370/336 |
| 2015/0358802 A1 | 12/2015 | Nagata et al. | |
| 2016/0007271 A1 | 1/2016 | Plicanic Samuelsson et al. | |
| 2016/0029429 A1 | 1/2016 | Peng et al. | |
| 2016/0044620 A1 | 2/2016 | Bagheri et al. | |
| 2016/0050702 A1 | 2/2016 | Sorrentino et al. | |
| 2016/0073391 A1 | 3/2016 | Awad et al. | |
| 2016/0088624 A1 | 3/2016 | Lee et al. | |
| 2016/0142898 A1 | 5/2016 | Poitau et al. | |
| 2016/0149660 A1 | 5/2016 | Seo et al. | |
| 2016/0183276 A1 | 6/2016 | Marinier et al. | |
| 2016/0192420 A1 | 6/2016 | Kim et al. | |
| 2016/0198507 A1 | 7/2016 | Wu et al. | |
| 2016/0205644 A1 | 7/2016 | Seo et al. | |
| 2016/0227495 A1 | 8/2016 | Lee et al. | |
| 2016/0227496 A1 | 8/2016 | Panteleev et al. | |
| 2016/0242065 A1 | 8/2016 | Fukuta et al. | |
| 2016/0255597 A1 | 9/2016 | Zhao et al. | |
| 2016/0337839 A1 | 11/2016 | Chae et al. | |
| 2016/0353397 A1 | 12/2016 | Jung et al. | |
| 2016/0360541 A1 | 12/2016 | Kim et al. | |
| 2016/0374039 A1 | 12/2016 | Khoryaev et al. | |
| 2017/0013640 A1 | 1/2017 | Loehr et al. | |
| 2017/0019937 A1 | 1/2017 | Kim et al. | |
| 2017/0027011 A1 | 1/2017 | Chae et al. | |
| 2017/0041891 A1 | 2/2017 | Chae et al. | |
| 2017/0048161 A1 | 2/2017 | Vanturennout et al. | |
| 2017/0086158 A1 | 3/2017 | Feng et al. | |
| 2017/0105225 A1 | 4/2017 | Sartori et al. | |
| 2017/0150398 A1 | 5/2017 | Laselva et al. | |
| 2017/0164249 A1 | 6/2017 | Uemura et al. | |
| 2017/0188320 A1 | 6/2017 | Xiong et al. | |
| 2017/0188321 A1 | 6/2017 | Matsumoto et al. | |
| 2017/0215159 A1 | 7/2017 | Yokomakura et al. | |
| 2017/0245221 A1 | 8/2017 | Boudreau et al. | |
| 2017/0303217 A1 | 10/2017 | Lee et al. | |
| 2017/0339679 A1 | 11/2017 | Lee et al. | |
| 2018/0219716 A1 | 8/2018 | Chae et al. | |

FOREIGN PATENT DOCUMENTS

| | | |
|---|---|---|
| CN | 104066126 A | 9/2014 |
| EP | 2 665 325 A1 | 11/2013 |
| EP | 2 900 022 A1 | 7/2015 |
| JP | 2014-153209 A | 8/2014 |
| KR | 10-2011-0036087 A | 4/2011 |
| KR | 10-2012-0074251 A | 7/2012 |
| KR | 10-2012-0134196 A | 12/2012 |
| KR | 10-2013-0063650 A | 6/2013 |
| KR | 10-2014-0073453 A | 6/2014 |
| KR | 10-2014-0090834 A | 7/2014 |
| KR | 10-2014-0117060 A | 10/2014 |
| KR | 10-2015-0027690 A | 3/2015 |
| KR | 10-2016-0054384 A | 5/2016 |
| WO | 2013/119077 A1 | 8/2013 |
| WO | 2013/180991 A1 | 12/2013 |
| WO | 2013/181515 A2 | 12/2013 |
| WO | 2013/181807 A1 | 12/2013 |

(56) References Cited

FOREIGN PATENT DOCUMENTS

| WO | 2013/181823 A1 | 12/2013 |
|---|---|---|
| WO | 2014/097224 A1 | 6/2014 |
| WO | 2015/034234 A1 | 3/2015 |
| WO | 2015/138083 A1 | 9/2015 |

OTHER PUBLICATIONS

Korean Office Action dated Oct. 11, 2021, issued in Korean Application No. 10-2015-0111304.
Baccelli et al., On the Design of Device-to-Device Autonomous Discovery, Jan. 2, 2012.
Sharp, D2D Network Coverage Definition & Mode Selection, 3GPP TSG RAN WG1 Meeting #77, R1-142208, May 19-23, 2014, Seoul, Korea.
3rd Generation Partnership Project; Technical Specification Group Radio Access Network; Study on LTE Device to Device Proximity Services; Radio Aspects (Release 12), 3GPP TR 36.843 V12.0.1, Mar. 2014.
ZTE, SA and Data Resource Allocation for Mode 1, 3GPP TSG-RAN WG1 Meeting #77, R1-142232, May 19-23, 2014, Seoul, Korea.
Catt, Discussion on D2D synchronization sources, R1-142894, 3GPP TSG RAN WG1 Meeting #78, XP050788378, Dresden, Germany, Aug. 10, 2014.
Ericsson; On Scheduling Assignments and Receiver Behaviour; 3GPP TSG-RAN WG1 Meeting #76bis; R1-141391; Mar. 31-Apr. 4, 2014; Shenzhen, China.
KDDI; Discussion on triggering condition for D2DSS transmission; 3GPP TSG RAN WG1 Meeting #78; R1-143159 Aug. 18-Aug. 22, 2014; Dresden, Germany.
Catt, 3GPP TSG RAN WG1 Meeting #78, R1-142892, Resource allocation for D2D synchronization, Aug. 18-22, 2014, Dresden, Germany.
Samsung, 3GPP TSG RAN WG1 #77, Identifier in scheduling assignment for D2D communication, R1-142107, May 19-23, 2014, Seoul, South Korea.
Chinese Office Action dated Jul. 2, 2019, issued in Chinese Patent Application No. 201580052290.7.
Chinese Office Action dated Sep. 20, 2019, issued in Chinese Patent Application No. 201580061873.6.
Qualcomm Incorporated: "Overview of D2D", 3GPP Draft; R4-145188, 3rd Generation Partnership Project (3GPP), Mobile Competence Centre ; 650, Route Des Lucioles ; F-06921 Sophia\ Ntipolis Cedex; France, vol. RAN WG4, No. Dresden, Germany; Aug. 18, 2014-Aug. 22, 2014 Aug. 12, 2014 (Aug. 12, 2014), XP050825935, Aug. 12, 2014.
Ericsson: "On Procedures for In/Out of NW coverage detection for D2D", 3GPP Draft; R1-140780 Out of Coverage Procedures_Final, 3rd Generation Partnership Project (3GPP), Mobile Competence Centre ; 650, Route Des Lucioles ; F-06921 Sophia-Antipolis Cedex ; France, vol. RAN WG1, No. Prague, CZ; Feb. 10, 2013-Feb. 14, 2013 Feb. 9, 2014, XP050736281, Feb. 9, 2014.
European Office Action dated Feb. 14, 2020, issued in European Application No. 15844060.2-1205.
Notice of Allowance dated Jan. 14, 2022, issued on Korean Application No. 10-2015-0123697.
Korean Office Action dated Jan. 27, 2022, issued in Korean Application No. 10-2015-0120274.
ZTE, 'Considerations on D2D Proximity Discovery', R2-132680, 3GPP TSG-RAN WG2 Meeting #83 R2-132680, Aug. 10, 2013.
Ericsson, 'Synchronization Procedures for D2D Discovery and Communication', R1-140773, 3GPP TSG RAN WG1 Meeting #76, Jan. 31, 2014.
ZTE, 'Discussions on necessity of supporting Discovery Type 2', R1-135373, 3GPP TSG-RAN WG1 #75, Nov. 2, 2013.
Qualcomm Incorporated, 'Control for D2D broadcast communication', R1-141966, 3GPP TSG-RAN WG1 #77, May 10, 2014.
Samsung, R1-142121, D2D synchronization procedure for partial network coverage, 3GPP TSG RAN WG1 #77, May 10, 2014, Seoul, South Korea May 19-23, 2014.
Samsung, R1-142120, D2D Synchronization Signal and Channel Design, 3GPP TSG RAN WG1 #77, Seoul, South Korea May 19-23, 2014.
Korean Office Action dated Apr. 28, 2021, issued in Korean Application No. 10-2015-0111304.
ZTE, Discussion of D2D Discovery, 3GPP TSG-RAN WG1 #74 R1-133149, Barcelona, Spain, Aug. 19-23, 2013.
Korean Office Action dated Jul. 20, 2021, issued in Korean Application No. 10-2015-0123697.
U.S. Non-Final Office Action dated Jun. 22, 2022, issued in U.S. Appl. No. 17/064,956.

* cited by examiner

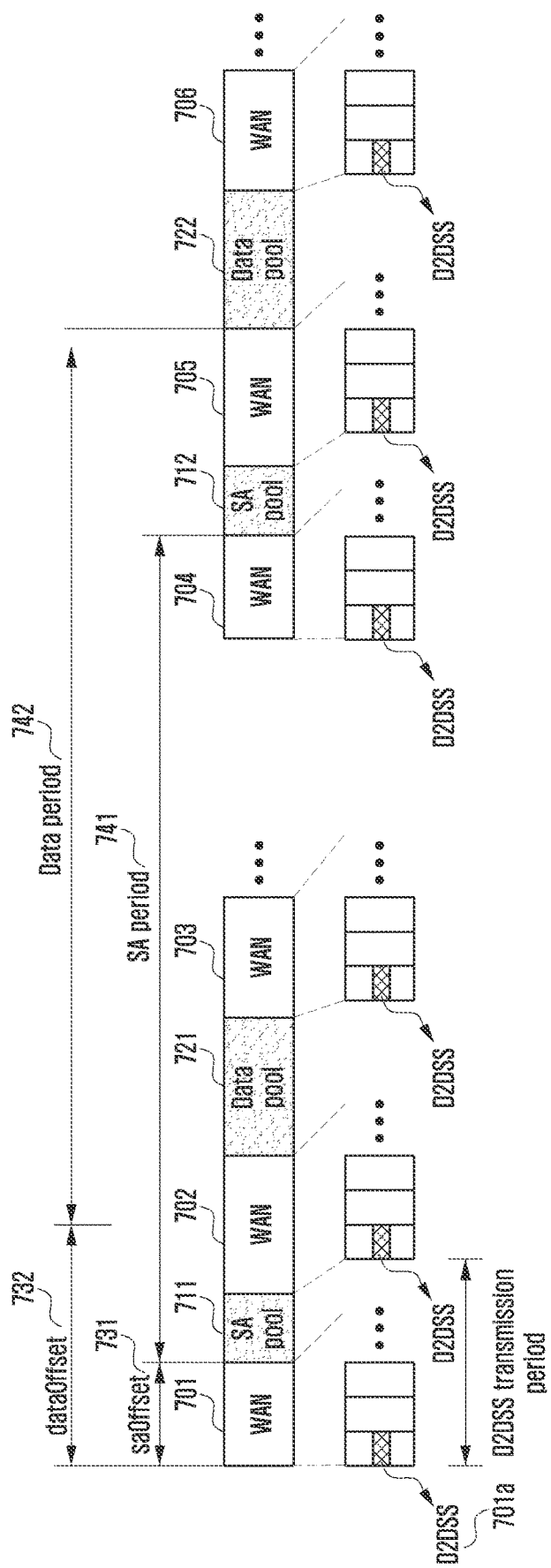

METHOD AND APPARATUS FOR TRANSMITTING/RECEIVING SYNCHRONIZATION SIGNAL IN DEVICE-TO-DEVICE COMMUNICATION SYSTEM

CROSS-REFERENCE TO RELATED APPLICATION(S)

This application is a continuation application of prior application Ser. No. 16/728,613 filed on Dec. 27, 2019; which is a continuation application of prior application Ser. No. 16/288,845 filed on Feb. 28, 2019, which has issued as U.S. Pat. No. 10,531,414 on Jan. 7, 2020; and which is a continuation application of prior application Ser. No. 14/818,573 filed on Aug. 5, 2015, which has issued as U.S. Pat. No. 10,225,810 on Mar. 5, 2019, and was based on and claimed the benefit under 35 U.S.C. § 119(e) of a U.S. Provisional application filed on Aug. 6, 2014 in the U.S. Patent and Trademark Office and assigned Ser. No. 62/033,798, of a U.S. Provisional application filed on Sep. 25, 2014 in the U.S. Patent and Trademark Office and assigned Ser. No. 62/055,232, and of a U.S. Provisional application filed on Nov. 6, 2014 in the U.S. Patent and Trademark Office and assigned Ser. No. 62/076,156, the entire disclosure of each of which is hereby incorporated by reference.

TECHNICAL FIELD

The present disclosure relates to device-to-device (D2D) communication. More particularly, the present disclosure relates to a synchronization signal transmission/reception method for use in a D2D communication system.

BACKGROUND

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'beyond 4G network' or a 'post long term evolution (LTE) system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

With the popularization of smartphones, data traffic is increasing rapidly. The increasing number of smartphone users spurs the consumption of smartphone-based application services such as social network services (SNSs) and games, resulting in an unprecedented increase in data traffic. Of particular concern, beyond person-to-person communication, if machine intelligence-based communications, such as person-to-machine and machine-to-machine communications, are activated as a new field of technology, traffic concentrations at base stations will increase too dramatically to accommodate the increased demand.

There is therefore a need of a technology to accommodate increased traffic, and direct communication between devices is coming into the spotlight as such a technology. This technology, so called D2D communication, is promising for licensed band communication systems such as cellular communication systems and unlicensed band communication systems such as wireless local area network (WLAN) systems.

LTE-based D2D communication is characterized by D2D discovery and D2D communication. D2D discovery is a process in which a user equipment (UE) checks identities or interests of other proximally located UEs, or advertises its identity or interests to other proximally located UEs. At this time, the identity and interests may be represented by a UE identifier (ID), an application identifier, or a service identifier. Further, the identities and interests can be variously configured depending on the D2D service and operation scenario.

In order to support D2D operation between D2D, UEs located in different cells in an asynchronous network, it is necessary to perform a synchronization procedure between the Tx and Rx D2D UEs. For this purpose, the Tx D2D UEs located in the respective cells transmit a D2D synchronization signal (D2DSS). There is therefore a need to implement rules for determining the D2DSS transmission timing, D2DSS Tx UE, and resources for D2DSS transmission. In a case where a plurality of UEs transmit D2DSS, an Rx UE may receive diverse D2DSSs. Accordingly, it is necessary to determine the timing and resources for transmitting each D2DSS. In a case of the LTE-based D2D system, this determination must be in compliance with the resource allocation and transmission rules of the LTE system.

However, no specification on D2DSS transmission timing and resource utilization of the D2D Tx UE has yet been proposed. Furthermore there is a need of specifying the operation of the D2D Rx UE in association with a Type 2B discovery transmission timing and a Mode 2 communication transmission timing configuration. However, there is currently no method specified for implementing such mechanisms.

There is therefore a need to specify resource allocation for synchronization between transmitter and receiver and operation of the receiver according to the determined transmission time and transmission timing in the system supporting D2D communication.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for allocating resources for synchronization between a transmitter and a receiver in a system supporting device-to-device (D2D) communication.

Another aspect of the present disclosure is to provide an apparatus and method for facilitating data transmission/reception using a signal transmission time and resources of a transmitter in a system supporting D2D communication.

Another aspect of the present disclosure is to provide a receiver adapted to the synchronization signal resource allocation scheme, transmission time, and transmission timing, and to provide a method for controlling the operations of the receiver.

In accordance with an aspect of the present disclosure, a method of transmitting a synchronization signal for D2D communication in an asynchronous network in which a first terminal, located in a first cell, controls synchronization with a second terminal, located outside of the first cell, is provided. The method includes transmitting, at the first cell, a system information block (SIB) including resource allocation information of the first cell and at least one neighboring cell, determining whether the first terminal is in a first mode and whether the first terminal is scheduled to perform one of a D2D communication and a D2D discovery, determining, when the first terminal is in the first mode, whether the first terminal is required to transmit a D2D synchronization signal (D2DSS), and transmitting, when the first terminal is required to transmit the D2DSS, scheduling information including a transmission time point, and transmission reference timing information to the first terminal.

In accordance with another aspect of the present disclosure, a method of transmitting a synchronization signal for D2D communication in an asynchronous network in which a first terminal located in a first cell establishes synchronization with a second terminal located outside of the first cell is provided. The method includes receiving, at the first terminal, a SIB including resource allocation information of the first cell from the first cell, determining whether the first terminal is operating in a first mode for transmission as scheduled by the first cell, transmitting, when the first terminal is operating in the first mode, a D2DSS based on scheduling information received from the first cell, determining, when the first terminal is operating in a second mode for performing at least one of communication and discovery by selecting certain resources based on the resource information included in the SIB, whether a D2DSS trigger condition received from the first cell is fulfilled, and transmitting, when the D2DSS trigger condition is fulfilled, the D2DSS, wherein the D2DSS is transmitted according to downlink transmission timing in the second mode.

In accordance with still another aspect of the present disclosure, a method of receiving a synchronization signal for D2D communication in an asynchronous network in which a first terminal located in a first cell establishes synchronization with a second terminal located outside of the first cell is provided. The method includes receiving, at the second terminal, a SIB including resource allocation information of the first and second cells from a second cell serving the second terminal, receiving a D2DSS from the first terminal based on the D2D resource allocation information of the first cell, receiving a maximum timing advance (TA) value of the first cell through a physical D2D synchronization channel (PD2DSCH) in a subframe carrying the D2DSS, determining a slot boundary based on the received D2DSS, configuring a reception window for one of a D2D discovery message and a D2D communication signal based on the slot boundary and the maximum TA value, and receiving at least one of the D2D discovery and the D2D communication signal from the first terminal during the reception window.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 7A, 7B, and 7C are diagrams illustrating a D2D synchronization signal (D2DSS) Tx resource allocation for an inter-D2D communication according to various embodiments of the present disclosure;

Throughout the drawings, it should be noted that like reference numbers are used to depict the same or similar elements, features, and structures.

DETAILED DESCRIPTION

Figure 1A:
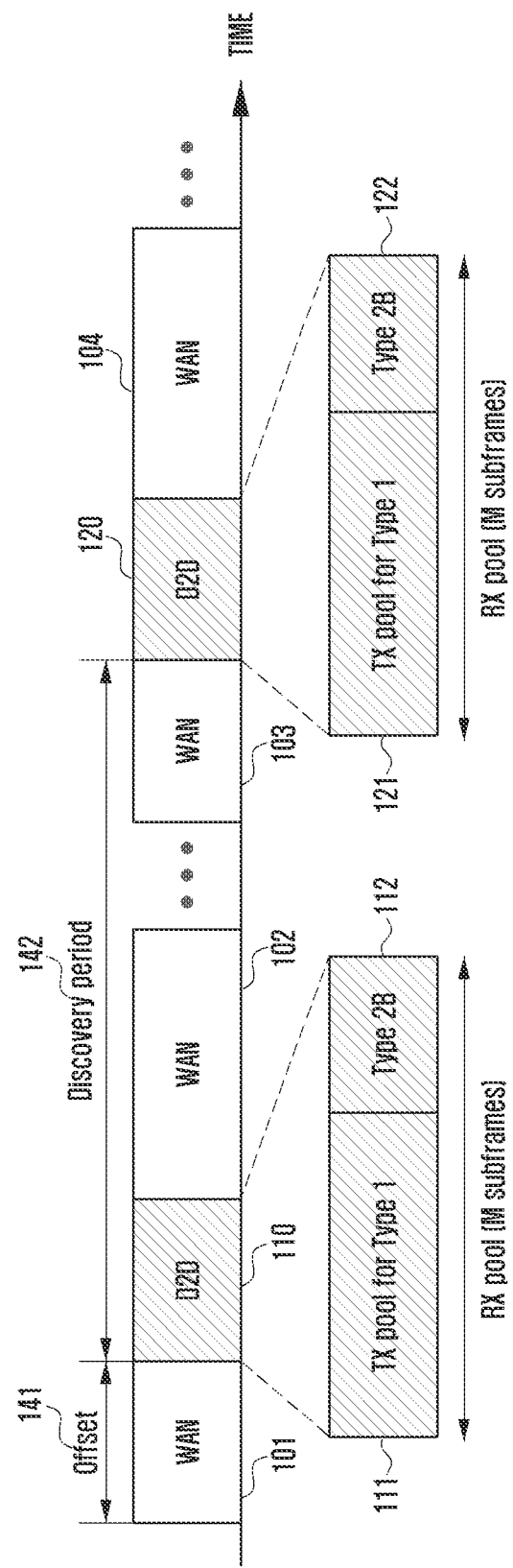
FIG. 1A is a diagram illustrating resource allocation for an inter-cell device-to-device (D2D) discovery in a long-term evolution (LTE) D2D system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

First, device-to-device (D2D) communication technology as a basis of the present disclosure is described.

It is assumed that protocol layers of D2D-enabled user equipment (UE) include a D2D application layer, a D2D management layer, and a D2D transport layer. The D2D application layer accommodates D2D service application programs running on the operating system (OS) of the UE, the D2D management layer is responsible for the function of converting the discovery information generated by a D2D application program to a format suited to the transport layer, and the transport layer corresponds to a physical/media access control (PHY/MAC) layer of a long-term evolution (LTE) or a wireless fidelity (Wi-Fi) wireless communication standard.

In the D2D communication technology, the D2D discovery is performed in the following procedure. If the user executes the D2D application program, the application layer generates discovery information to the D2D management layer. The management layer converts the discover information received from the application layer to a management layer message. The management layer message is transmitted through the transport layer of the UE. The UEs receiving the message operates in the reverse order of the transmission process.

The D2D communication is a communication method of exchanging traffic between UEs without assistance of any infrastructure entity such as an e-Node B (eNB) or an access point (AP). The D2D communication may be performed based on the result of the D2D discovery procedure (i.e., with the discovered UEs) or without D2D discovery procedure. Whether the D2D discovery procedure is required before the D2D communication depends on the D2D service and operation scenario.

The D2D service scenarios may be categorized into commercial service or non-public safety service and public safety service. The services may include a countless number of examples such as advertisement services, social network services (SNS), game services, and public safety service.

The aforementioned types of services are described briefly hereinafter.

First, a description is made of a case where the D2D technology is applied to advertisement services.

A communication network operator supporting D2D allows preregistered stores, cafes, movie theaters, and restaurants to advertise their identities to the D2D users located within a short distance using the D2D discovery or D2D communication. At this time, the interests may include advertisers' promotion, event information, and discount coupon. If the corresponding identity match the interest of the user, the user may pay a visit to the corresponding store to collect more information through the legacy cellular communication or the D2D communication. In another example, a personal user may discover a taxi around him/her through the D2D discovery and exchange data about destination or fare through the legacy cellular communication or D2D communication.

Second, a description is made of a case where the D2D technology is applied to SNS.

The user may send other uses located within a short distance the user's application and interests in the corresponding application. At this time, the identity or interest used for D2D discovery may be a buddy list or the application identifier. The user may share contents such as photos and videos with the neighboring users through the D2D communication after the D2D discovery.

A description is made of a case where the D2D technology is applied to game services.

The user discovers other users and game applications for playing a mobile game with the neighboring users through the D2D discovery procedure and perform D2D communication for transmitting data necessary for the game.

Finally, a description is made of a case where the D2D technology is applied to public safety services.

The police and firefighters may use the D2D communication technology for the public safety purpose. That is, in a case where the cellular communication is not available due to cellular network breakage caused by emergency situation such as fire and landslide or natural disaster such as an earthquake, a volcano eruption, and a tsunami, such that the police and firefighters may discover neighboring colleagues or share the emergency situation information with neighboring users using the D2D communication technology.

The current 3rd generation partnership project (3GPP) LTE D2D standardization is directed to both the D2D discovery and D2D communication but different in standardization range. The D2D discovery aims to commercial use and thus has to be designed to operate in the network coverage area of the eNB. That is, the D2D discovery is not supported in the situation where no eNB exists (or out of the coverage area of an eNB).

Meanwhile, the D2D communication aims to the public safety and disaster network service other than commercial use. Thus the D2D communication has to be designed to support both in and out of network coverage and in a partial network coverage area of the eNB (a communication in a situation where some UEs are located in the coverage area of the eNB and other UEs are located out of the coverage area of the eNB). Accordingly, the public safety and disaster network service is provided through the D2D communication without support of the D2D discovery.

In the LTE D2D of which the standardization is in progress, both the D2D discovery and D2D communication are performed in LTE uplink subframes. That is, the D2D transmitter transmits D2D discovery signal and data for D2D communication in the uplink subframes, and the D2D receiver receives them in the uplink subframes. In the current LTE system, the UE receives data and control information from the eNB through downlink and transmits data and control information to the eNB through uplink, but the operations of the current D2D transmitter/receiver may differ from those in the legacy LTE.

For example, the D2D function-enabled UE has an orthogonal frequency division multiplexing (OFDM)-based receiver to receive the downlink data and control information from the eNB and a single carrier-frequency division multiplexing (SC-FDM)-based transmitter to transmit uplink data and control information to the eNB. However, the D2D UE has to support both the cellular mode and D2D mode. Thus, the D2D UE has to have an extra SC-FDM receiver to receive the D2D data and control information in uplink as well as the OFDM-based receiver to receiving downlink data from the eNB and the SC-FDM-based transmitter to transmit uplink data or control information to the eNB.

The current LTE D2D defines two types of D2D discovery schemes according to resource allocation scheme.

(1) Type 1 discovery: The eNB broadcasts the uplink resource pool available for D2D discovery in a system information block (SIB) for all D2D UEs within the cell under its control. At this time, the resource size available for D2D (e.g., x consecutive subframes) and period of resource (e.g., repeating at every y seconds) are informed. If the sending D2D UEs which have received the information select the resource for transmitting D2D discovery signal in a distributed manner. At this time, the resource selection may be performed in various manners. The simplest method is to select the resource randomly. That is, the D2D Tx UE may select the resource for D2D discovery randomly in Type 1 the resource region indicated from the SIB. Meanwhile, the Rx D2D UEs receive and decode all D2D discovery signals transmitted in the resource pool indicated by the SIB. The Type 1 discovery allows for the UEs operating in a cellular radio resource control (RRC)_Idle mode and an RRC_Connected mode to transmit/receive D2D signals.

(2) Type 2 discovery: The eNB notifies the receiving D2D UEs of the discovery resource pool using the SIB. The Tx discovery signal resources for the sending D2D UEs are scheduled by the eNB. That is, the eNB commands the D2D Tx UEs to transmit signals at predetermined time-frequency resources. At this time, the eNB may perform scheduling in a semi-persistent manner or a dynamic manner and, for this purpose, the D2D Tx UE has to transmit a scheduling request or D2D Tx request including buffer status report (BSR) to the eNB. The D2D Tx UE also has to operate in the cellular RRC_Connected mode to use the Type 2 discovery. That is, the D2D Tx UE in the RRC_Idle mode has to transition to the RRC_Connected mode through the random access procedure for D2D Tx resource request.

Like the D2D discovery method, the D2D communication method also has two operation modes determined according to resource allocation scheme.

(1) Mode 1: In a case of operating in Mode 1, the eNB or a release 10 relay notification of the resource transmitting data and control information for D2D communication of the D2D transmitter.

(2) Mode 2: In a case of operating in Mode 2, the D2D transmitter selects the resource in a distributed manner in the corresponding resource pool autonomously based on the resource pool information acquired for data and control information transmission.

The aforementioned D2D discovery and D2D communication should be supported between the UEs located in different cells as well the UEs located in the same cell. The present disclosure relates to a method for performing D2D operations between the UEs location in different cells in the cellular-based D2D system. Particularly, the present disclosure relates to a method for a UE located in a cell of an asynchronous network in which the eNBs are not synchronized to transmit a D2D signal to a UE located in a neighboring cell and a method for a UE located in a cell to receive the D2D signal transmitted by another UE located in a neighboring cell.

A description is made of the operations of the eNB and UE in the Intra-cell D2D network.

(1) Synchronization

UEs receive the primary synchronization signal/secondary synchronization signal (PSS/SSS) transmitted by an eNB and perform downlink synchronization with the eNB. Meanwhile, the UEs located in the cell for transmitting uplink data and control information perform uplink synchronization with the eNB. The uplink synchronization is established through a random access (RA) procedure, and the UEs receive timing advance (TA) information from their serving eNB in the uplink synchronization procedure. If the TA information is received, the UE starts a TA timer and maintains the TA value received from the eNB until the timer expires. That is, if the TA information is received from the eNB, the UE uses the corresponding TA for transmitting uplink control information and data until the TA timer expires. If the TA timer expires, the RA procedure is performed again to acquire new TA information.

In the Type 1 discovery, the D2D discovery signal is transmitted in compliance with the downlink reference timing. That is, the D2D discovery signal is transmitted in compliance with the time when the PSS/SSS is received from the eNB. Meanwhile, the reference time for transmitting D2D discovery signal is not determined yet in the Type 2B discovery. That is, in the Type 2B discovery, there is no specification on whether to match the transmission timing of the D2D discovery signal with the downlink reference timing like the Type 1 discovery or an uplink reference timing unlike the Type 1 discovery, i.e., TA-based transmission like legacy cellular terminal.

(2) Resource Allocation

The eNB may transmit the following information through an SIB for supporting the intra-cell D2D operation.

Discovery type: The eNB transmit the information on the discovery type supported in its cell (Type 1 or Type 2 or both). Similarly, the information on the communication mode (Mode 1 or Mode 2 or both) is transmitted for the D2D communication. Meanwhile, the eNB transmits the information on whether its cell support only the discovery service, only the communication service, or both the discovery and communication services.

Transmission pool: The transmission pool information can be applied to only the Type 1 discovery and Mode 2 communication. All intra-cell D2D UEs receive the transmission pool information from their serving eNB. The transmission pool information may include the information on the structure of the transmission pool. For example, it may include a number of subframes forming the transmission pool and a number of resource blocks (RBs) forming a subframe. Such information can be expressed in various formats. For example, the D2D subframe configuration information may be expressed in the form of a bitmap, e.g., 1011100 . . . (1 for D2D subframe and 0 for cellular subframe). In a case of transmitting the subframe configuration information in the form of the bitmap, each bit may be set to 1 for D2D subframe or 0 for cellular subframe. Of course, it is obvious to those skilled in the art that each bit of the bitmap may be set to 0 for D2D subframe or 1 for cellular subframe. The number of RBs constituting the D2D subframe may be configured with the start and end points of the RB on the frequency axis. There may be more various methods for providing the Tx resource pool information.

The UE attempting to transmit a D2D discovery signal in Type 1 discovery and the UE attempting to transmit data and control information in Mode 2 communication may select the transmission resource in the transmission pool indicated from the eNB.

Reception pool: The reception pool information can be applied to all of Type 1/Type 2 discovery and Mode 1/Mode 2 communication. All intra-cell D2D UEs receives the reception pool information from the eNB. The reception pool information may include the information on the structure of the reception pool and configured in the same way as the transmission pool information. All intra-cell D2D UEs receive and decode all RBs existing in the discovery resource pool. Meanwhile, it is characterized that the transmission pool is a subset of the reception pool. That is, there may be a transmission pool consisted of N subframes in the reception pool consisted of M subframes. At this time, the relationship between M and N may be M≥N.

A description is made of the inter-cell D2D operation in an asynchronous network.

(1) Synchronization

In the synchronous network, the eNBs synchronize their transmission and reception timings one another using a global positioning system (GPS). Thus, in the synchronous network, all intra-network eNBs are synchronized among each other. In the asynchronous network, however, the eNBs do not use GPS and thus not synchronized among each other. In a case where the eNBs are not synchronized, the inter-cell interference problem is more significant in comparison to the synchronous network. In order to solve the synchronization problem, in the asynchronous network, the network synchronization is performed through X2 interface between the eNBs or S1 interface between an eNB and a higher the level entity (e.g., mobility management element (MME)) of the Core Network. However, although the inter-eNB synchronization is performed using the network synchronization protocol, it is difficult to secure subframe-level synchronization accuracy. That is, the neighboring cell B may have a time offset being earlier or later up to ½ subframe (0.5 ms) at the subframe boundary of cell A.

In the Type 1 discovery or Mode 2 communication, the D2D UEs transmit D2D signals in compliance with the downlink reference timings of their serving eNBs. Accordingly, there is a need of establishing synchronization among the D2D UEs located in the different cells in the asynchronous network including non-synchronized eNBs not synchronized. In the LTE Release-12 D2D, it is determined that the X2 interface between eNBs is not used for supporting inter-cell D2D operation. That is, the timing information of the neighboring cell is not provide to the UE served by the serving cell through the X2 interface. Accordingly, a D2DSS is defined to perform synchronization among the UEs located in different cells without timing information of the neighboring cell.

(2) Resource Allocation

In order to support D2D operation between D2D UEs located in different cells of the synchronization network without timing information exchange between neighboring cells through the X2 interface, operation administration maintenance-based (OAM-based) resource allocation is considered. That is, the higher level entity of the network, e.g., MME, acquires the timing information (system frame number (SFN)) of the eNBs under its control through the S1 interface. Using the timing information, the eNBs can allocate the D2D resources. Particularly, it is characterized that the cells allocate the D2D resources not to be overlapped on the time axis. Assuming that there are cells A, B, and C, the D2D resource pool of the cell A is allocated for the time period T1 (corresponding M1 subframes), the D2D resource pool of the cell B for the time period T2 (corresponding to M2 subframes), and the D2D resource pool of the cell C for the time period T3 (corresponding to M3 subframes). At this time, the time durations T1, T2, and T3 should not be overlapped.

The D2D pool may be configured with consecutive D2D subframes or non-consecutive D2D subframes. For example, if the D2D resource pool of the cell A is allocated with consecutive D2D subframes, the D2D resource pool allocated during the time period T1 is composed of the D2D subframes (i.e., M1 subframes are all sued for D2D). Meanwhile, if the D2D resource pool of the cell A is allocated with non-consecutive D2D subframes, the subframes for cellular subframes and D2D subframes are time division multiplexed (TDM'ed) in the time period T1.

The serving cell transmit the resource allocation information of the neighboring cell to the UEs using SIB. That is, the serving informs the UEs of the D2D resource pool of the neighboring cell as well as its own. The UEs perform D2D transmission and reception procedure using the resource allocation information of the serving and neighboring cells which is received from the serving cell. At this time, the D2D transmission may be performed in the serving cell D2D transmission pool (Type 1 discovery or Mode 2 communication) or on the specific time-frequency resource in the serving cell D2D reception pool under the control of the eNB (Type 2 discovery or Mode 1 communication).

Meanwhile, the D2D reception is performed in both the serving cell D2D reception pool and neighboring D2D reception pool. For example, the Tx D2D UEs of the cell A transmit signal using the D2D transmission pool in the time period T1 (Type 1 discovery or Mode 2 communication), and the Rx D2D UEs that are not performing D2D transmission in the cell A receives and decodes all RB in the D2D reception pool (Type 1 discovery). Also, they receive and decode all RB in the D2D reception pool of the neighboring cells B and C (applied commonly to Type 1 discovery and Type 2B discovery).

A method of transmitting and receiving D2DSS for D2D operation between UEs located in different cells in an asynchronous network according to the present disclosure is described in detail hereinafter. A description is made of the operation of the Rx UE according to Type 2B discovery transmission time and Mode 2 communication transmission time configuration method in the present disclosure hereinafter.

Descriptions are made of the methods of the present disclosure briefly.

(1) Method of Transmitting/Receiving a D2DSS Between D2D UEs:

There are four determinant factors for D2DSS transmission between D2D UEs. First, a D2DSS transmission timing should be determined. Second, a D2DSS Tx UE selection method should be determined. That is, it is required to determine a UE which is transmitting the D2DSS. Third, a D2DSS transmission resource selection method should be determined. Finally, a D2DSS transmission time should be determined.

(2) Rx UE Operation According to Type 2B Discovery Tx Timing Configuration:

The Type 2B discovery message may be transmitted according to the downlink transmission timing or uplink transmission timing. Accordingly, the operation of the Rx UE may be categorized into one of downlink Tx timing-based Type 2B discovery message transmission operation and uplink Tx timing-based Type 2 discovery message transmission operation.

(3) Rx UE Operation According to Mode 2 Communication Tx Timing Configuration:

The Rx UE operation may vary depending on the Mode 2 communication Tx timing configuration. The Rx UE may operate distinctly when the Mode 2 communication data is transmitted according to the downlink transmission timing and when the Mode 2 communication data is transmitted according to the uplink transmission timing.

Descriptions are made of the operations of sections (1), (2), and (3) hereinafter in more detail.

Meanwhile, the D2D UE may acquire D2D discovery and D2D communication resource allocation information from an SIB transmitted by the eNB to perform D2D discovery/communication. That is, the eNB sends the D2D UEs located in the corresponding cell through the SIB. At this time, the resource allocation information broadcast through the SIB may include the neighboring cell resource allocation information as well as the serving cell resource allocation information.

A. Resource Allocation Information of Serving Cell:

Discovery type (or communication mode): Information on discovery type (Type 1, Type 2, or both) or communication mode (Mode 1, Mode 2, or both). In a case of discovery, if this information is received, the D2D UEs can check whether a specific cell supports the Type 1 or Type 2 discovery (or both). In a case of communication, the UE can check whether the cell support Mode 1 communication or Mode 2 communication or both of them.

Tx and Rx resource pools information: The Tx and Rx resource pools information may include the information as follows.

a) A case of cell supporting only Type 1 discovery (or Mode 2 communication): Since the reception pool is identical with the transmission pool, one resource pool information is included without distinction.

b) A case of cell supporting only Type 2 discovery (or Mode 1 communication): Since the Type 2 discovery message (or Mode 1 communication data) is transmitted based on the scheduling of the eNB, no transmission pool exists in Type 2 discovery. Accordingly, the reception pool information is included.

c) A case of cell supporting both Type 1 and Type 2 discoveries: The transmission pool information for Type 1 and reception pool information for both the Type 1 and Type 2 discovery are included.

d) Transmission pool or reception pool configuration information: The number of subframes constituting the transmission or reception pool, the number of RBs constituting a subframe, etc. This information can be expressed in various formats. For example, The D2D subframe configuration information can be informed in the form of a bitmap, e.g., 1011100 . . . . As described above, each bit of the bitmap may set to 1 for D2D subframe or 0 for cellular subframe or vice versa. The number of RBs constituting the D2D subframe can be configured with the start point and end point of the RB on the frequency axis.

e) Start frame and period of transmission pool or reception pool.

f) After receiving the D2D resource pool information transmitted by the eNB through SIB, the D2D UE has to know whether the corresponding pool is the transmission pool or the reception pool. This information is transmitted through a 1-bit signaling notifying the discovery type or communication mode such that the D2D UE performs appropriate operation in the corresponding resource pool. For example, the discoveryType and communicationMode as 1-bit size signaling information transmitted through SIB may be defined with 1 bit respectively. The discoveryType is set to '0' for Type 1 discovery or '1' for Type 2B discovery. Similarly, the communication mode is set to '0' for Mode 1 communication or '1' Mode 2 communication. Such signaling information may be transmitted along with the resource pool information, e.g., D2D subframe configuration information expressed with bitmap and configuration information of RBs to be used for D2D discovery or D2D communication in the D2D subframe.

B. Neighboring Cell Resource Allocation Information:

The neighboring cell resource allocation information may be configured with the same information as the serving cell resource allocation information with or without some additional information.

1) Discovery type (or communication mode).
2) Transmission pool and reception pool information of neighboring cell.
3) Neighboring cell ID.

For example, the D2D UEs of cell A acquires the serving cell resource allocation information, neighboring cell ID, and neighboring cell transmission pool and reception pool information corresponding to respective IDs from the SIB transmitted by their serving eNBs. At this time, the OAM performs coordination such that the resource pools of the serving cell A and neighboring cells are not overlapped.

Although the UEs of the respective cell acquire the resource allocation information of the serving and neighboring cells from their serving cells and, in the synchronous network, network synchronization procedure is performed through the network synchronization protocol, synchronization offset of up to +0.5 ms exists. Accordingly, the subframe level synchronization is not acquired among the cell and thus it is impossible to receive the D2D signal transmitted from neighboring cells.

(1) D2DSS Tx/Rx Method:

First, a description is made of the D2DSS transmission/reception method among the aforementioned techniques.

In the synchronization network made up of the cells synchronized accurately, it is not necessary to receive the D2DSS. That is, because of the synchronization among the neighboring cells, the subframe boundaries match each other. Accordingly, the D2D UEs of the respective cells that are synchronized with the serving eNB know the subframe boundary of the neighbor cell and thus there is no need to receive the D2DSS. For example, in a case where a cell is split into a plurality of sectors, the sectors are likely to be synchronized one another. In the LTE system, however, an asynchronous network made up of the cells exist and, in such an asynchronous network, it is necessary to transmit the D2DSS for supporting D2D operation between cells.

The higher level entity, e.g., MME, of the eNB may determine whether the network is a synchronous or asynchronous network and may command to transmit the D2DSS or not through S1 interface. If the D2DSS is received, the eNBs may command the D2D UEs which they are serving to transmit the D2DSS or not. For example, if D2DSSTransmission=0, this means that the cells are synchronized with each other and thus the D2D UEs do not transmit the D2DSS. In contrast, if D2DSSTransmission=1, this means that the network is unsynchronized and thus the D2D UEs transmit the D2DSS.

In order to transmit the D2DSS, it is necessary to determine the D2DSS transmission timing, the D2DSS transmission UE selection method (who), D2DSS transmission resource location method (where), and D2DSS transmission time (when); and operates based on the determination result. Descriptions are made the aforementioned 4 factors in series hereinafter.

A. D2DSS Transmission Timing Configuration Method:

The UE may transmit the D2DSS in compliance with the downlink timing of the eNB or the uplink timing of the eNB. In a case of transmitting the D2DSS in compliance with the downlink timing, the D2DSS and the cellular physical uplink shared channel (PUSCH) or cellular physical uplink control channel (PUCCH) multiplexed in the same subframe may cause inter-carrier interference (ICI). That is, the D2DSS transmitted in compliance with the downlink timing and the cellular PUSCH transmitted at the uplink reference timing, breaks the orthogonality on the time access due to the different transmission reference timings, thereby resulting in the occurrence of an interference problem at the receiver front end of the eNB and D2D front end.

Meanwhile, in a case of transmitting the D2DSS in compliance with the uplink timing, it may be difficult for the Rx D2D UEs in the RRC_Idle state to receive the D2DSS. That is, the D2DSS Tx UE transmits the D2DSS earlier to the same extent as a predetermined offset ($N_{TA} \cdot A_s$) as compared to the downlink reference timing based on the TA information received from the eNB. The offset time may be referred to as TA, and since it may change depending on the distance between the D2DSS Tx UE and the eNB and the positions of the D2D Tx UE and D2D Rx UE, the Rx D2D UE in the RRC_Idle state without such information may not configure the receiving window for receiving the D2DSS. That is, it does not know how much it has to advance the receiving window for signal reception.

In order to solve this problem, the serving eNB may transmit to all D2D UEs within the cell the maximum offset of its cell and the maximum offset of neighboring cells (maximum TA value) using an SIB. If the offset information is received through the SIB, the D2D UEs adjusts the receiving window to the same extent as the maximum offset acquired through the SIB to receive the D2DSS.

Whether to apply the downlink timing or uplink timing for transmitting the D2DSS is communicated to all D2D UEs within the cell when the serving eNB transmits the resource pool information through the SIB (Type 1 discovery) or to a specific UE supposed to transmit the D2DSS through dedicated RRC signaling. For example, assuming that the serving eNB supports three discovery (or communication) resource pools, each resource pool can be the transmission pool or reception pool depending on whether it is the Type 1 discovery or Type 2B discovery. Also, the D2DSS transmitted in each resource pool may be transmitted in compliance with the uplink transmission timing or downlink transmission timing. At this time, the transmission reference timing of the D2DSS may be signaled (D2DSStiming). That is, the transmission reference timing of the D2DSS in the pools 1 and 2 which is set to downlink (D2DSStiming=0) and the transmission reference timing of the D2DSS in the resource pool 3 which is set to uplink (D2DSStiming=1) may be transmitted to all UEs within the cell using the SIB.

In a case of Type 2B discovery, the UEs transmitting the discovery messages (i.e., Tx D2D UEs) are in the RRC_Connected state. Since the eNB knows the Tx D2D UE in the cell, it commands the corresponding D2D UEs to transmit the D2DSS through dedicated RRC signaling along with the transmission reference timing of the D2DSS.

B. D2DSS Tx UE Selection Method (Who):

A description is made of a case where all D2D UEs transmit the D2DSS.

First, suppose that all UEs located in cell A transmit the D2DSS. The D2DSS transmitted by the UE located at the cell center (near the eNB) may not be received by the UEs located in the neighboring cells. This means that the D2DSS transmission causes unnecessary power consumption. This problem becomes worse when the D2DSS is Frequency-Division-Multiplexed (FDM'ed) with the cellular data and control information or D2D discovery message. The reason is that D2DSS transmit power control is performed to prevent the D2DSS transmission from incurring the ICI or in-band emission problem to the cellular data and control information or D2D discovery message. Since the D2D transmit power control decreases the D2DSS transmission coverage, it may be worse for all D2D UEs to transmit the D2DSS.

Second, suppose that specific D2D UE transmits the D2DSS. When the D2DSS Tx transmit power control is not considered in Type 1 discovery, the D2D UE may measure the reference signal received power (RSRP) of the serving eNB. If the RSRP of the serving eNB is greater than threshold X dBm, i.e., if the distance from the eNB is greater than a predetermined threshold D m, the D2D UE transmits the D2DSS. If the D2DSS transmit power control is performed in Type 1 discovery, the D2D UE may calculated the transmit power based on the RSRP (open-loop power control). The transmit power of the D2D UE is greater than Y dBm, it can transmit the D2DSS. The threshold values may include X dBm, D m, and Y dBm. These threshold values are transmitted from the eNB to the D2D UEs within the cell through an SIB and are determined differently depending on the radius of the cell.

Meanwhile, the UE performing the Type 1 discovery performs the open-loop power control to minimize the in-band emission or ICI problem occurring to the cellular uplink. Accordingly, it may be specified for the Tx D2D UE to transit the D2DSS when the transmit power of the Tx D2D UE is greater than a predetermined threshold $P_{TH}$ in the Type 1 discovery. At this time, the threshold value $P_{TH}$ is transmitted to the UE through an SIB. Also, the UEs in the RRC_Connected state among the D2D UEs participating the Type 1 discovery acquire the TA information, it can be specified for the corresponding UEs to transmit the D2DSS when the TA value which the UEs in the RRC_Connected state have is greater than a predetermined threshold value.

In Type 2 discovery, however, the D2DSS transmission UE is determined by the eNB. For example, the eNB may check the TA information of the D2D UEs in the RRC_Connected state and, if the TA value of a UE is greater than a predetermined threshold value, command the corresponding UE to transmit the D2DSS. In a case where the transmit power is controlled for D2DSS transmission, the eNB may notify the D2DSS transmission UE of the transmit power value through RRC signaling, or the UE uses the transmit power used for previous cellular uplink transmission or D2D transmission or boosts the transmit power up to Z dB based on the previous transmit power value. At this time, the Z dB power boosting value is communicated to the D2DSS transmission UE through RRC signaling or using the downlink control information (DCI) of the physical downlink control channel (PDCCH).

Even in the Type 2 discovery, the D2DSS transmission UE may be determined autonomously by the UE, instead of the eNB, as in the Type 1 discovery. At this time, the threshold values for determining the UE may be communicated from the eNB through an SIB. For example, the RRC_Connected UEs which know their TA values determine whether to transmit the D2DSS autonomously using the TA threshold value acquired through the SIB.

C. D2DSS Tx Resource Location Method (Where):

A description is made of Type 1 discovery. The objective of transmitting the D2DSS is to make it possible for a UE located in the neighboring cell to find the start time of the serving cell resource pool (start subframe). Accordingly, the D2DSS may be transmitted at the first subframe in the transmission resource pool of the serving cell.

A description is made of Type 2 discovery. There can be different scenarios depending on whether a certain cell supports only the Type 2B discovery or both the Type 1 and Type 2B discoveries. Descriptions are made of a case where only the Type 2 discovery is supported and a case where both the Type 1 and Type 2 discoveries, respectively.

First, a description is made of a case of supporting only the Type 2B discovery. Like the Type 1 discovery, since the objective of transmitting the D2DSS is to make it possible for the UE located in a neighboring cell to fine the start point of the serving cell resource pool, the D2DSS may be transmitted at the first subframe in the reception pool of the serving cell. In this case, D2DSS transmission and reception problems may occur in view of the D2DSS transmission UE of the serving cell and the D2DSS reception UE of the neighboring cell.

1) Problem at D2DSS Tx UE:

There can be a scenario in which the transmission time of the D2DSS is based on the downlink reference timing of the serving cell and the Type 2B discovery signal is transmitted based on the uplink reference timing (based on TA information of the UE). In this scenario, assuming that the $n^{th}$ subframe is the first subframe of the reception pool, the UE attempting to transmit the D2DSS at the $n^{th}$ subframe and the discovery signal at the $(n+1)^{th}$ subframe consecutively has to give up the D2DSS transmission at the $n^{th}$ subframe or the Type 2D discovery signal transmission at the $(n+1)^{th}$ subframe, if the TA value is greater than 1 symbol. This is because the symbols at the ending part of the $n^{th}$ subframe and the symbols at the beginning part of the $(n+1)^{th}$ subframe may collide due to the difference between the transmission reference timings of the $n^{th}$ and $(n+1)^{th}$ subframes.

In order to solve this problem, the eNB does not allocate the Type 2B discovery signal resource to the UEs, which transmits the D2DSS at the $n_{th}$ subframe, at the $(n+1)^{th}$ subframe. In a case where the priority of the Type 2B discovery signal (e.g., service priority or delay time priority) is high, the eNB may schedule the Type 2B discovery signal at the $(n+1)^{th}$ subframe but not the D2DSS at the $n^{th}$ subframe.

2) Problem at D2DSS Rx terminal:

There can be a scenario in which the transmission time of the D2DSS is based on the downlink reference timing of the serving cell and the Type 2B discovery signal is transmitted based on the uplink reference timing (based on TA information of the UE). In a case of receiving the D2DSS at the $n^{th}$ subframe and the Type 2B discovery signal at the $(n+1)^{th}$ subframe, significant ICI or inter symbol interference (ISI) may occur at the $(n+1)^{th}$ subframe. In order to solve this problem, is can be considered to us a gap wide enough. In the LTE system, it is specified to support the cell radius up to 100 km and, since the difference between the uplink and downlink reference timings is large in such a cell with a large cell radius, it may be necessary to use a gap corresponding to 8 or more SC-FDM or OOFDM symbols to solve the ICI/ISI problem.

However, the use of such a long gap is likely to cause resource utilization inefficiency, when the $n^{th}$ subframe is allocated for D2DSS transmission, it can be considered to allocate the $(n+1)^{th}$ subframe for cellular data and control information transmission, and the $(n+2)^{th}$ subframe for the Type 2B discovery signal transmission. At this time, the eNB may schedule the UE with a large TA at the $(n+1)^{th}$ subframe to mitigate the interference of the cellular data transmitted at the $(n+1)^{th}$ subframe to the discovery signal scheduled at the $(n+2)^{th}$ subframe.

Meanwhile, since the Rx UE does not know the TA value of the Type 2B discovery signal transmitted from the neighboring cell, it does not know the receiving window. Accordingly, The Rx UE has to receive the signal under the assumption of the receiving window long enough. In a case where the cell radii of the neighboring cells differ from each other, it may be difficult for the UE to configure the receiving window.

Accordingly, it may be possible for the serving cell of the D2DSS transmission UE to communicate the maximum TA value using the physical D2D synchronization channel (PD2DSCH) at the subframe carrying the D2DSS. The Rx UE which has acquired the time/frequency synchronization by receiving the D2DSS receives and decodes the PD2DSCH, adjusts the receiving window based on the TA information of the neighboring cell indicated by the PD2DSCH, and receives the Type 2B discovery signal. The serving eNB may notify the D2D UEs location in its cell of the TA information of the neighboring cell through the SIB. That is, the serving eNB can communicate the maximum TA value in the cell-specific resource pool information through the SIB. If the SIB is received from the serving eNB, the UE receives the D2DSS in the resource pool of the neighboring cell and adjusts the receiving window based on the TA value indicated in the SIB. This method facilitates the operation of the Rx UE. Meanwhile, the eNB notifies all D2D UEs within its cell of the maximum TA value through the PD2DSCH.

A description is made of a case of supporting both the Type 1 and Type 2B discoveries.

In a case of supporting both of the two types, the transmission resource pool for Type 1 discovery may be positioned in the first half or the last half of the reception resource pool.

First, in a case where the transmission resource pool for Type 1 discovery is located in the first half of the reception resource pool:

Since the D2DSS is transmitted in the first frame of the transmission pool for the Type 1 discovery, the Rx UE can find the start point of the reception pool based on the corresponding D2DSS. Accordingly, it is not necessary to transmit D2DSS for Type 2B. However, the Type 1 discovery signal is transmitted in compliance with the downlink reference timing, and the Type 2B discovery signal is transmitted in compliance with the uplink reference timing. For efficient operation of the Rx UE, it communicates the TA information of its cell, i.e., maximum TA supported by its cell, through PD2DSCH.

Second, in a case where the transmission resource pool for Type 1 is located in the last half of the reception resource pool:

The D2DSS for the Type 2B discovery and the D2DSS for Type 1 discovery can be used independently. That is, the sequences used in the D2DSS for Type 2B and D2DSS for Type 1 differ from each other. By using this, the Rx UE can acquire the start point of the reception pool and the start point of the transmission pool.

Meanwhile, it is possible to acquire the start point of the reception pool without transmitting additional D2DSS for Type 2B discovery. In order to achieve this, the D2DSS transmission UE transmits the PD2Dsch including the offset value from the D2DSS subframe for Type 1 discovery.

D. D2DSS Tx Timing Determination Method (When):

The D2DSS transmission timing determination method may be categorized into one of a system viewpoint-based determination method and a UE viewpoint-based determination method. In the former case, the D2DSS is transmitted periodically. That is, the first subframe of the transmission pool is the D2DSS transmission resource in the Type 1 discovery, and the first subframe of the reception pool is the D2DSS transmission resource in the Type 2B discovery. Since the discovery resources are allocated periodically, the D2DSS is transmitted periodically from the viewpoint of the system.

The D2DSS transmission timing may be determined from the viewpoint of the UE. In the latter case, the periodic D2DSS transmission may cause unnecessary power consumption of the UE. For example, if the UE moves from the cell edge to the cell center, although it transmits the D2DSS periodically, the neighboring cell UEs do not receive the D2DSS. Accordingly, each UE transmits the D2DSS only when a condition is fulfilled using the aforementioned D2DSS transmission UE selection method.

The present disclosure is described in more detail hereinafter with reference to the accompanying drawings.

Specifically, FIGS. 1 through 15, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

FIG. 1A is a diagram illustrating resource allocation for an inter-cell D2D discovery in an LTE D2D system according to an embodiment of the present disclosure.

Referring to FIG. 1A, resources 101, 102, 103, 104, 110 and 120 are illustrated, where the resources 101, 102, 103 and 104 are for LTE cellular communication of UEs located in a cell (e.g., a wide area network (WAN)) and the resources 110 and 120 are for D2D communication of the UEs are TDM'ed.

Each of the resources 110 and 120 allocated for D2D communication is composed of M subframes that may be designated for Tx resource pools 111 and 121 and Rx resource pools 112 and 122.

In FIG. 1A, the resource 110 which is supposed to be allocated to the D2D UE appearing first, may be an Rx resource pool. A part of the D2D resource pool may be configured as a Type 1 Tx resource pool 111, and the remaining part 112 may be allocated as Type 2B resource. In this case, since there are UEs supporting only Type 1, the UEs supporting only Type 2, and the UEs supporting both the types 1 and 2 in the coverage area of the If the eNB has allocate the resource as shown in FIG. 1A, then it may send the UE the information including an offset 141 for indicating a start point of the D2D resource and a discovery period 142 of the D2D resource through an SIB as described above. For example, the serving eNB may send all D2D UEs connected to its cell the D2D discovery resource pool information through the SIB. The UE can check the position of the D2D resource as depicted in FIG. 1A and acquire the information on the operation mode supported in the discovery period and allocated resource. Descriptions are made of the information included in the SIB which is broadcast by the eNB for all D2D UEs located in the cell.

(1) discoveryPoolType: Information indicating Tx pool or Rx pool.

(2) discoveryPeriod: Period of D2D resource pool.

(3) discoveryStartPRB, discoveryEndPRB: Frequency axis resource information in D2D resource pool.

(4) discoveryOffset: Information indicating start point of D2D resource pool (position of start subframe).

In more detail, the discoveryPoolType is the information indicating whether the type of the resource is Tx pool or Rx pool for use in determining whether it is the resource pool for Type 1 discovery or Type 2 discovery (hereinafter, Type 2 discovery means Type 2B discovery). For example, if the discoveryPoolType set Tx pool is signaled, the D2D Tx/Rx UEs determine that the corresponding pool is the resource pool for the Type 1 discovery. Otherwise, if discoveryPoolType set to Rx pool is signaled, the corresponding resource pool may be the resource pool supporting only the Type 2 discovery.

As exemplified in FIG. 1A, if the Type 1 discovery resource pool and the Type 2B discovery resource pool are TDM'ed or FDM'ed, discoveryPoolType=both may be signaled.

As exemplified in FIG. 1A, the Rx pool (Type 1 discovery+Type 2 discovery) made up of M subframes and the Tx pool (Type 1 discovery) made up of K subframes may be signaled. In another embodiment, discoveryPoolType=Type 1, discoveryPoolType=Type 2, or discoveryPoolType=both is signaled directly. Depending on the discoveryPoolType, discoveryPeriod, discoveryStartPRB, discoveryEndPRB, and discoveryOffset may be set differently.

The subframes constituting the D2D resource pools are transmitted in the form of a bitmap, and FIG. 1A shows an example of using M subframes are all used for D2D. Accordingly, the bitmap representing the subframes constituting the resource pool becomes '11111111 . . . '.

Meanwhile, the discoveryOffset is the information indicating the subframe position from which the D2D source pool starts. For example, the serving eNB may communicate the start point of the D2D resource pool based on its $0^{th}$ SFN.

Figure 1B:
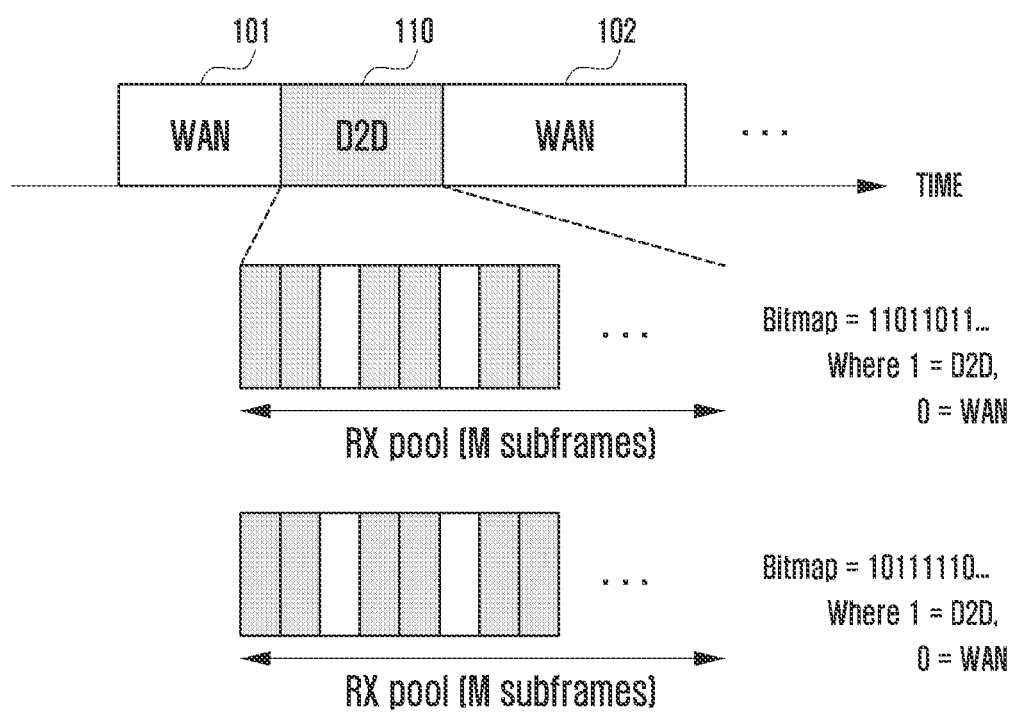
FIG. 1B is a diagram illustrating a bitmap representing a resource pool in an intra-cell D2D discovery according to an embodiment of the present disclosure.

FIG. 1B is a diagram illustrating a bitmap representing a resource pool in an intra-cell D2D discovery according to an embodiment of the present disclosure.

Referring to FIG. 1B, a D2D resource 110 and LTE resources 101 and 102 (e.g., WAN) are illustrated, where the D2D resource 110 may be positioned between the LTE resources 101 and 102 as described above. The D2D resource 110 may be divided into D2D subframes and WAN subframes for allocation to the LTE UEs.

For example, if the D2D subframe is represented by 1 while the WAN subframe is represented by 0, the bitmap may be configured in various formats. FIG. 1B shows the bitmaps configured as '11011011 . . . ' and '10111110 . . . '. In FIG. 1B, the shaded area denotes the D2D subframes and the non-shaded area denotes the WAN subframes.

In a case of supporting only the Type 1 discovery, the Tx pool consists of M subframes. In a case of supporting only the Type 2B discovery or the Type 1 discovery and Type 2B discovery are TDM'ed or FDM'ed, the Rx pool consists of M subframes.

Figure 2A:
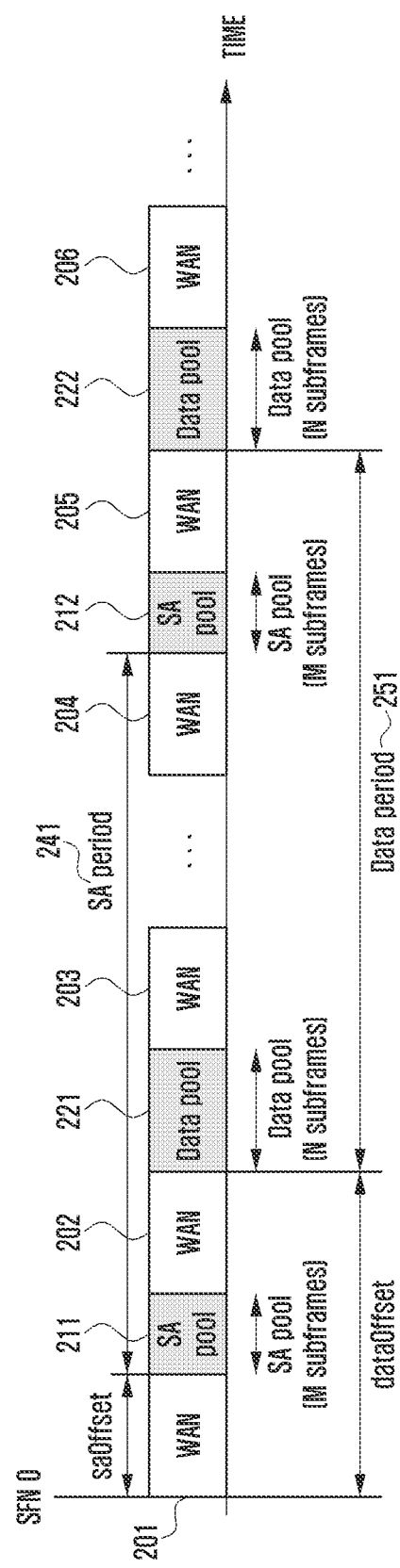
FIGS. 2A and 2B are diagrams illustrating a resource allocation for intra-cell D2D communication in an LTE D2D system according to various embodiments of the present disclosure.
Figure 2B:
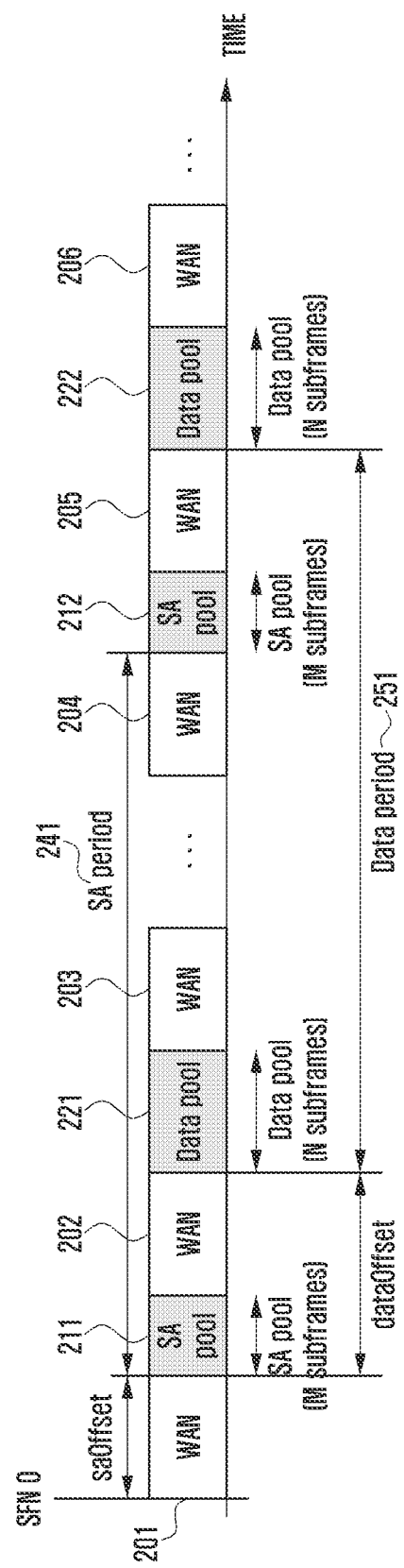

FIGS. 2A and 2B are diagrams illustrating a resource allocation for intra-cell D2D communication in an LTE D2D system according to various embodiments of the present disclosure.

Referring to FIG. 2A, WAN resources 201, 202, 203, 204, 205 and 206, scheduling assignment (SA) resource pools 211 and 212 and data resource pools 221 and 222 for D2D communication are illustrated, where the WAN resources 201, 202, 203, 204, 205 and 206 are arranged from a start point of SFN 0 on a time axis, and the SA resource pools 211 and 212 and data resource pools 221 and 222 for D2D communication are arranged between them. The resource arrangement information may be configured by the eNB and provided to all UEs within the coverage area of the corresponding eNB through an SIB.

As shown in FIG. 2A, the data offset may be the value of indicating the start time of the data period in association with the start point of SNF 0. As shown in FIG. 2B, the data offset may indicate a number of subframes from the start time of the SA subframe in another example. FIGS. 2A and 2B differ from each other in start point of the data offset. That is, the data offset indicates the distance from the start point of the SFN 0 in FIG. 2A but the distance from the start point of the SA resource pool in FIG. 2B. As shown in FIGS. 2A and 2B, an SA period 241 for SA transmission and a data period 251 for data transmission are differentiated from each other. At this time, each of the SA pools 211 and 212 consists of M subframes, and each of the data pools 221 and 222 consists of N subframes.

As described above, the serving eNB transmits the SA and data resource pools information for D2D communication to all UEs connected to its cell through the SIB. At this time, the resource pool information carried in the SIB may include the information as follows.

(1) communicationPoolType: Information whether the SA is the Mode 1 SA or Mode 2 SA.

(2) saPeriod: Period of SA resource pool.

(3) SA bitmap: Information indicating structure of SA subframe.

(4) saStartPRB, saEndPRB: Information of resource on frequency axis in SA resource pool.

(5) saOffset: Information indicating start point (start subframe) of SA resource pool.

(6) dataPeriod: Period of data resource pool.

(7) data bitmap: Information indicating structure of data subframe.

(8) dataStartPRB, dataEndPRB: Information of resource on frequency axis in data resource pool.

(9) dataOffset: Information indicating start point (start subframe) of data resource pool.

The subframes constituting the SA and data resource pool are transmitted in the form of a bitmap as in the discovery. FIGS. 2A and 2B show cases of using M subframes all for SA as denoted by reference number 211 and 212 and N subframes all for data as denoted by reference numbers 221 and 222. Accordingly, the bitmap representing the subframes constituting the SA and data resource pool is shown as 11111111 . . . . If the bitmap of SA and data includes 0 (e.g., 10110 . . . , etc.), 0 indicates the subframe without SA or data for D2D communication.

The dataOffset is the information indicating the position of the subframe at which the SA resource pool starts, and the dataOffset is the information indicating the position of the subframe at which the data resource pool starts. For example, the serving eNB may communicate the start point of the SA and data resource pools in association with the SNF 0 as shown in FIG. 2A or a predetermined SFN. Also, the dataOffset may indicate the start point of the data subframe in association with the SFN 0 as shown in FIG. 2A or in association of the start point of the SA resource pool as shown in FIG. 2B.

In a case where the SA resource pool is subsequently followed by the data resource pool (if there is no WAN between the SA resource pool and the data resource pool in FIGS. 2A and 2B), it may not necessary to use dataOffset indication through SIB.

The resource allocation for inter-cell D2D communication is similar to that for intra-cell D2D communication. The serving eNB transmits neighboring Cell IDs, communication PoolType, SA resource pool information (saPeriod, saBitmap, saStartPRB, saEndPRB, and saOffset), and data resource pool information (dataPeriod, dataBitmap, dataStartPRB, dataEndPRB, and dataOffset). Further, the D2D UEs connected to the serving eNB (RRC_Connected state) and the D2D UEs camped on the serving eNB (RRC_Idle state) receive the information through the SIB. The UE transmits signals in the resource pool of the serving eNB and receives SA and data in the resource pool of the neighboring eNBs based on the received information.

Figure 3A:
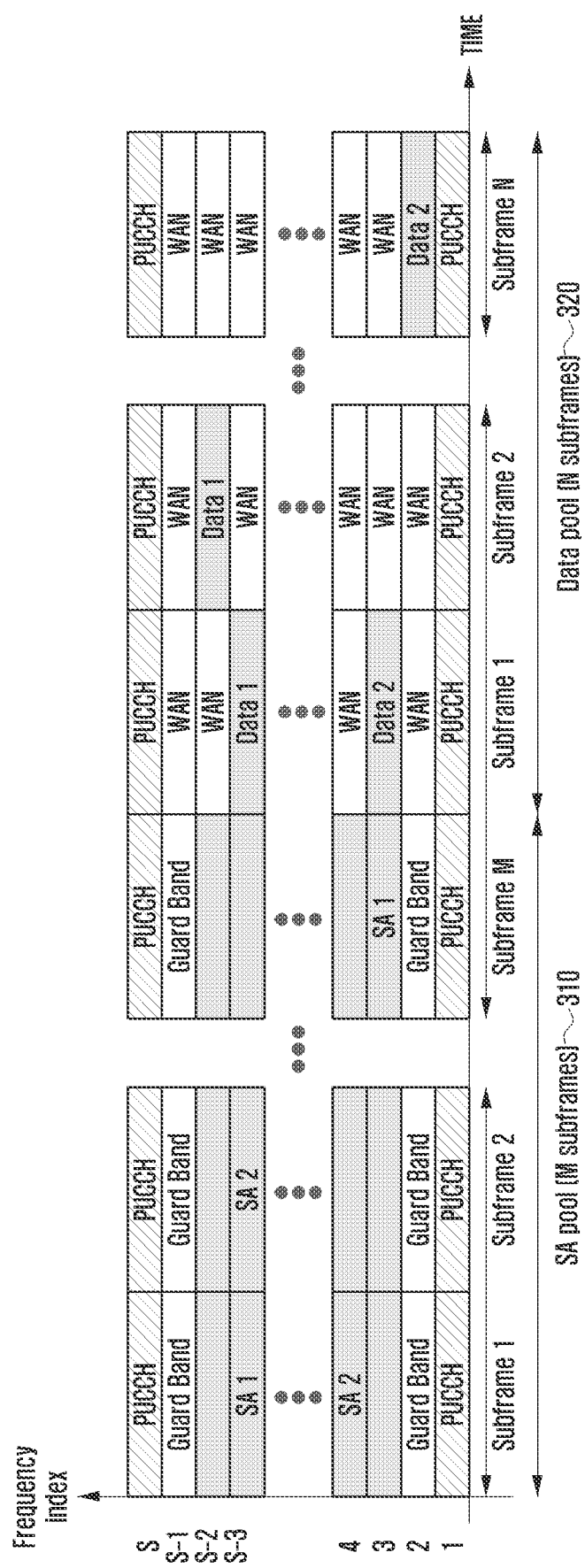
FIGS. 3A and 3B are diagrams illustrating a scheduling assignment (SA) and data resource allocations for D2D communication according to various embodiments of the present disclosure.
Figure 3B:
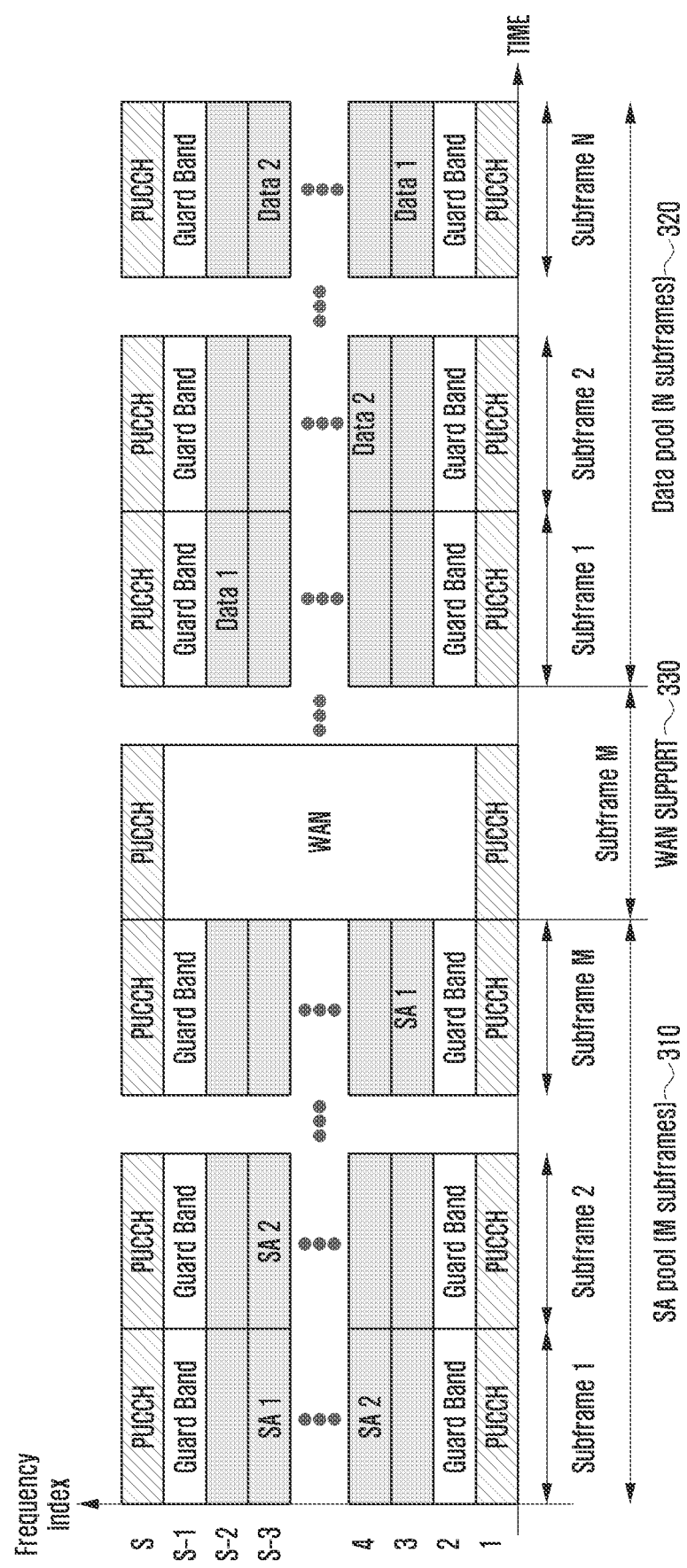

FIGS. 3A and 3B are diagrams illustrating an SA and data resource allocations for D2D communication according to various embodiments of the present disclosure.

Referring to FIG. 3A, a diagram illustrating the resource allocation for Mode 1 communication is provided, and referring to FIG. 3B a diagram illustrating the resource allocation for Mode 2 communication is provided.

Referring to FIG. 3A, PUCCHs are mapped to subframes positioned at both edges of a frequency band, i.e., all of the subframes indicate the frequency indices 1 and S, and at least one guard band may be position between the frequencies to which the PUCCH and SA are mapped. Also, the SA information may be transmitted on the frequency resource with the exception of the part corresponding to PUCCH and guard band for a predetermined number of subframes of the SA resource pool 310.

Meanwhile, the Mode 1 communication is allocated the SA resource pool 310 for M subframes and, subsequently, the data resource pool 320 for N subframes. In FIG. 3A, the subframes at both boundary frequencies of the data resources, i.e., the subframes on the frequencies with indices 1 and S, are occupied by PUCCH, and the data resource may include the WAN resource and D2D resource. In FIG. 3A, the shaded area in the data resource pool 320 indicates the D2D data resource.

Referring to FIG. 3B, a WAN resource (support) 330 is allocated between the SA resource pool 310 and the D2D data resource pool 320, and the D2D data resource pool 320 is used dedicatedly so as not to be used for WAN communication. Accordingly, the boundary frequencies of the D2D resource pool 320 consisted of N subframes are allocated for PUCCH, and guard bands are interposed between the D2D data resource and PUCCH resources.

In the D2D communication based on the resource configuration as shown in FIGS. 3A and 3B, the SA which is transmitted by the D2D Tx UE may include the control information as follows:

(1) Frequency hopping indicator;
(2) Frequency resource;
(3) MCS (Modulation and Coding Scheme);
(4) T-RPT (Time-Resource Pattern of Transmission);
(5) TA (Timing Advance); and
(6) ID (Identifier).

In the SA information, the frequency hopping indicator is 1-bit indication information indicating whether there is frequency hopping in the data region 320 following the SA transmission. The frequency resource indicates the frequency position and sized of the data resource on the frequency axis. The T-RPT indicates the D2D data transmission pattern on the time axis in the form of a bitmap. For example, if the bitmap of the T-RPT included in the SA is 1101110, 1 indicates the subframe carrying D2D data and 0 indicates the subframe carrying no D2D data. The TA is the information transmitted for adjusting the receiving window in the SA when the D2D data transmitted in compliance with the uplink reference timing is received. That is, the TA included in the SA is transmitted form the eNB to the Tx D2D UE for use in adjusting the receiving window when the Rx D2D UE receives data.

The ID included in the SA is a "destination ID" as the ID of a specific group or a UE belonging to the group. At this time, the group is the group set for supporting public safety such as a firefighter group, police group, and SWAT group. For example, if the SA Tx UE transmits the data targeted to the firefighter group, the destination ID included in the SA may be the fighter group ID.

In the Mode 1 communication, the eNB communicates the SA resource pool start point (saOffsetIndicator) and period (saPeriod) on the time axis and start point (saStartPRB) and end point (saEndPRB) on the frequency axis and the entire PRB size (saNumPRB) occupied by the SA on the frequency axis in a subframe. The reason for transmitting such information through SIB is to make it possible for the RRC_Idle UEs to receive the SA.

The UE intending transmission through Mode 1 communication, among the UEs decoded the SA resource pool information broadcast through the SIB, should be in the RRC_Connected state. The UE in the RRC_Idle state has to transition to the RRC_Connected state through the random access procedure. The Tx D2D UE transitioned to the RRC_Connected state is allocated the time/frequency resource through SA from the eNB. At this time, the time/frequency resource allocation information of the SA is transmitted through the downlink control information (DCI) included in the PDCCH. At this time, in order to check whether the resource is allocated for D2D transmission or cellular uplink transmission, the DCI for D2D resource allocation is scrambled with D2D-dedicated radio network temporary identifier (RNTI).

The Mode 1 communication is characterized in that no resource for data transmission exists. That is, the eNB notifies the Tx D2D UE of the time/frequency position information of the data transmission resource (not data resource pool information) using DCI other than SIB. After decoding the DCI received from the eNB, the Tx D2D UE checks the time/frequency position for data transmission and transmits the SA including the corresponding information. The Rx D2D UE which has acquired the SA resource pool information through the SIB decodes the SA in the corresponding SA resource pool to check the data resource time/frequency position in the SA and then decodes the data.

In the Mode 2 communication, like the Mode 1 communication, the eNB broadcasts the SA resource pool information (saPeriod, saNumPRB, saStartPRB, saEndPRB, saOffsetIndicator, saSubframeBitmap, etc.) through an SIB. Unlike the Mode 1 communication, the eNB broadcast the data transmission resource pool information through the SIB too. That is, the SIB may carry the data resource pool period, data resource pool StartPRB, data resource pool EndPRB, data resource pool NumPRB, data resource pool OffsetIndicator, data resource pool SubframeBitmap, etc.

In the Mode 2 communication, the eNB only communicates the SA and data resource pool information and thus the UE selects the resource to use in the SA and data resource pool in a distributed manner. That is, the Tx D2D UE selects the SA resource randomly or in an energy sensing-based manner from the SA resource pool and determines the time-resource pattern of transmission (T-RPT) and frequency resource position for data transmission. The T-RPT and frequency resource position for data transmission is applied in the data resource pool. The Rx D2D UE decodes the SA and data resource pool information received from the eNB through the SIB. The UE receives the SA in the SA and data resource pool and decodes the corresponding data in the data resource pool using the T-RPT and frequency resource position included in the SA.

FIG. 3A shows a resource allocation in the Mode 1 communication in which the eNB communicates the time/frequency resource for SA transmission of the Tx D2D UE in the SA resource pool transmitted through the SIB using the DCI of PDCCH. That is, the eNB instructs the Tx D2D UE 1 to transmit the SA 1 on the $(N-1)^{th}$ frequency resource in the subframe 1 and the Tx D2D UE 2 to transmit the SA 2 on the $(N-3)^{th}$ frequency resource in the subframe 2. In order to solve the half-duplex problem in the D2D communication, it is required for the UEs belonging to the same group to do not transmit the SA in the same subframe.

The half-duplex problem can solved as described above (the eNB schedules such that the UE 1 transmits SA at subframe 1 and UE 2 transmits SA at subframe 2). For robust transmission of SA, it is possible to transmit the SA repeatedly. The repetitive transmission occurs K times in the SA resource pool where K may be set to a value equal to or less than the number of subframes of the SA resource pool. Although only the SA, Guard Band, and PUCCH are depicted in FIG. 3A, The SAs may be FDM'ed with the cellular data WAN in the SA pool. At this time, the Guard band is used to avoid the ICI problem occurring between the PUCCH transmitted in compliance of the uplink reference timing based on TA and the SA transmitted in compliance with the downlink reference timing. Meanwhile, the time/frequency resource for D2D data transmission is allocated by the eNB through DCI of PDCCH, and the Tx D2D UE includes the allocated time/frequency resource information in the T-RPT and data RB allocation included in the SA and decodes the data at the corresponding time/frequency resource position.

FIG. 3B shows a resource allocation in the Mode 2 communication in which the Tx D2D UE selects resource for SA transmission in the SA resource pool indicate in the SIB. At this time, the resource selection can be performed randomly or in an energy-based manner. In a case of random selection, all SA transmission resources for repetitive transmission may be selected randomly in the SA resource pool. That is, in order to solve the half-duplex problem in the SA resource pool consisted of M subframes and transmit SA robustly, the same SA can be transmitted K times repeatedly. At this time, K may be set to a value equal to or less than M. In this case, the SA resource for K transmissions may be selected randomly at every transmission timing. Also, the frequency position of the SA resource selected in the subframe 1 may be mapped to the frequency resource positions of the (K-1) repetitive transmissions implicitly. Such mapping information may be specified in the standard or configured by the eNB through SIB. After selecting the SA resource, the Tx D2D UE selects the T-RPT indicating the frequency resource and time resource for data transmission and transmit the corresponding SA in the selected T-RPT.

At this time, the frequency resource and T-RPT selection for data transmission is made regardless of the SA resource selection or mapped to the SA resource. In a case of determining regardless of the SA resource selection, the Tx D2D UE which has selected the SA resource may determine the frequency resource and T-RPT for data transmission randomly. Otherwise, if the data resource is mapped to the SA resource, the position of the SA resource may be mapped to the position of the time/frequency position of the data resource implicitly.

In the Mode 2 communication, the time/frequency positions of the SA and data resource pools are transmitted to all D2D UEs within the cell through the SIB. The SA and data resource pools may not be consecutive as shown in FIG. 3B. That is, there may be the resource 330 for uplink cellular transmission between the SA resource pool 310 and data resource pool 320.

In FIG. 3B, it is assumed that the Mode 2 data is transmitted in compliance with the downlink reference timing. Unlike FIG. 3A, a Guard Band may exist between the PUCCH and Mode 2 data in the data resource pool. If the Mode 2 data is transmitted in compliance with the uplink reference timing like the Mode 1 data of FIG. 3A, the Guard Band is not necessary in the data resource pool of FIG. 3B.

Figure 4A:
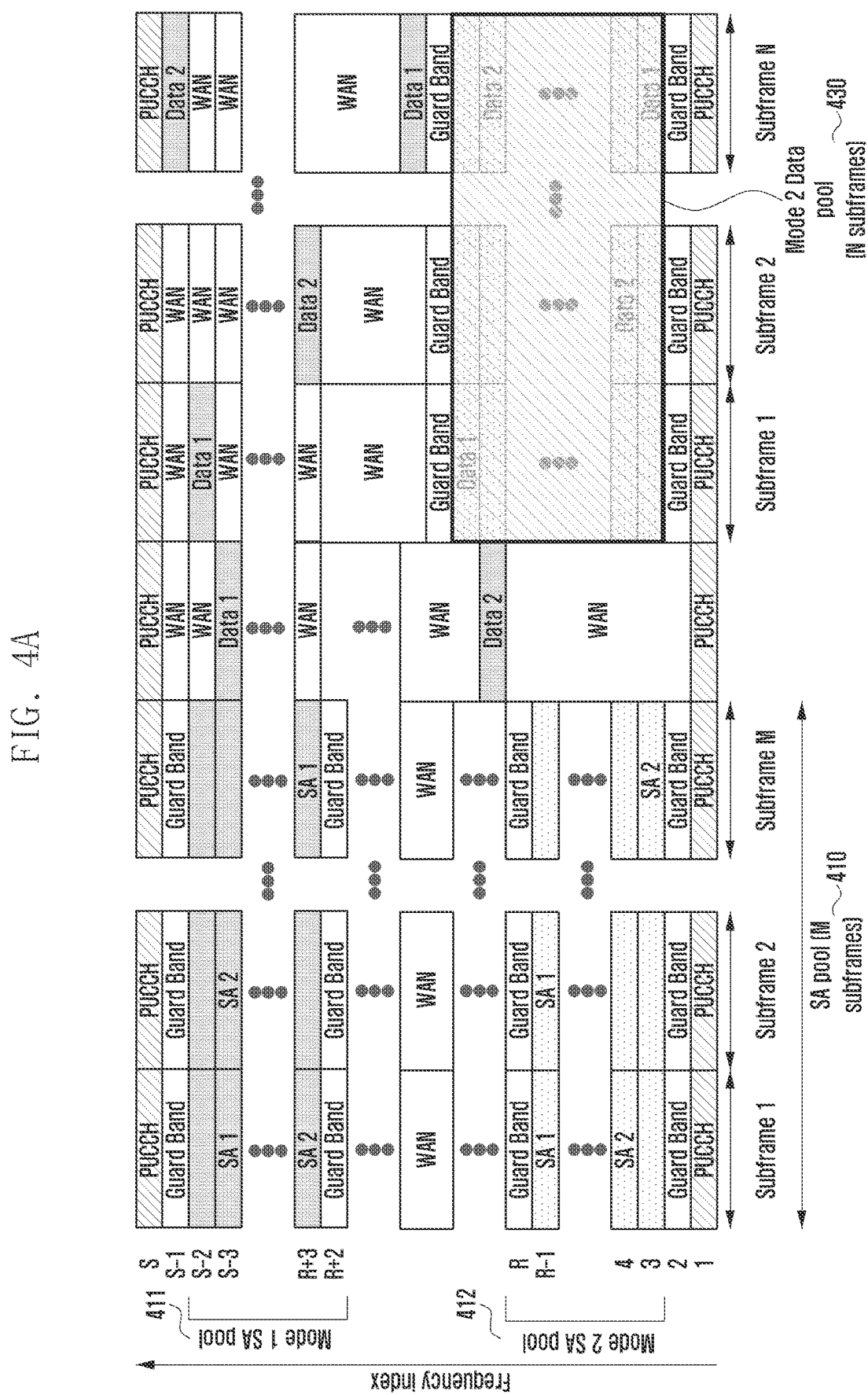
FIGS. 4A and 4B are diagrams illustrating an SA and a data resource allocation in a case where Mode 1 and Mode 2 SAs are frequency division multiplexed (FDM'ed) according to various embodiments of the present disclosure.
Figure 4B:
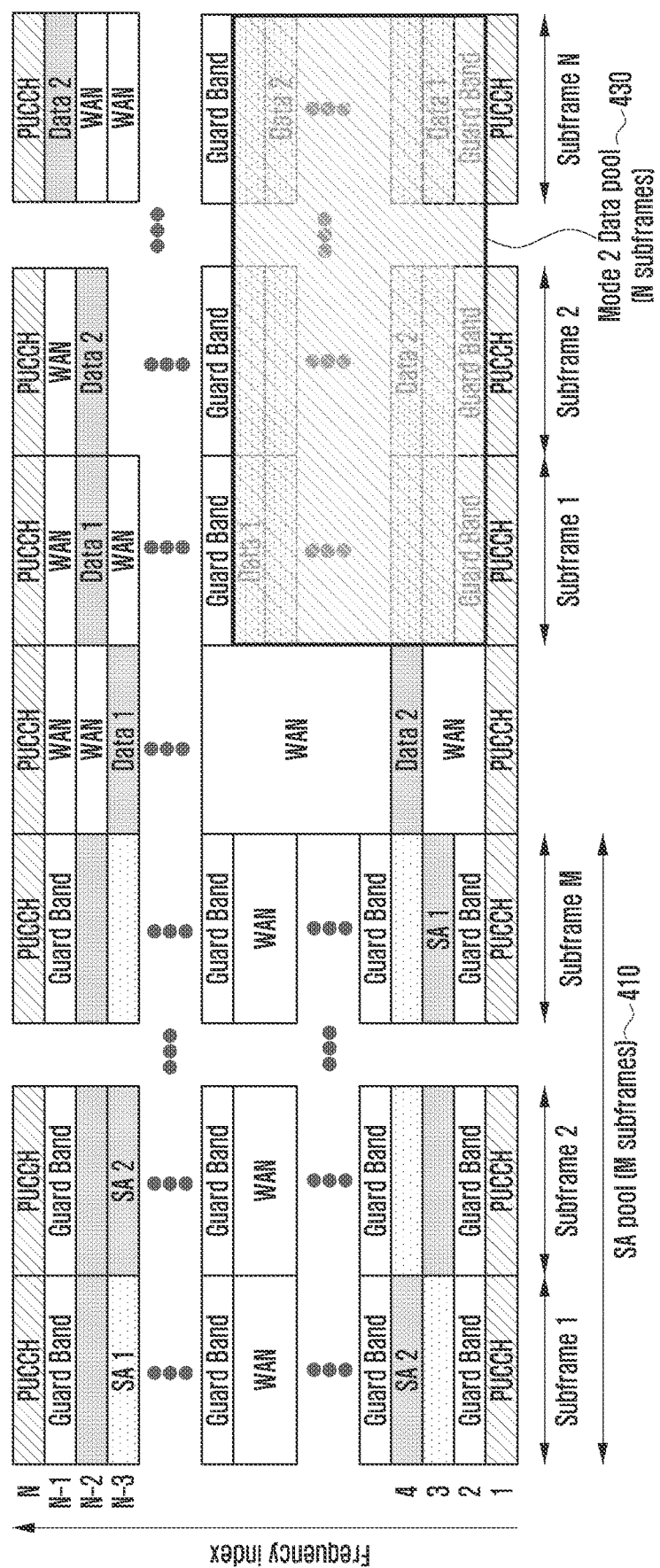

FIGS. 4A and 4B are diagrams illustrating an SA and a data resource allocation in a case where Mode 1 and Mode 2 SAs are FDM'ed according to various embodiments of the present disclosure.

FIGS. 4A and 4B show other examples of the SA and data resource allocation according to various embodiments of the present disclosure in which the SA for Mode 1 communication and the SA for Mode 2 communication are FDM'ed in the same SA resource pool 410.

Referring to FIG. 4A, a Mode 1 SA resource pool 411 and a Mode 2 SA resource pool 412 are illustrated, where the Mode 1 SA resource pool 411 and the Mode 2 SA resource pool 412 are identical on the time axis but different in the frequency axis. The frequency resource of the Mode 1 SA pool is saStartPRB=S-2, NumPRB1=(S-2)-(R+3)+1, and the frequency resource of the Mode 2 SA pool 412 has saEndPRB=3, NumPRB2=(R-1)-3+1. In order to reduce signaling overhead, the NumPRB1 and NumPRB2 may have the same value. The frequency resource position of the SA pool may be allocated by the eNB through a SIB. The time axis resource (subframes) 410 of the common SA pool of Mode 1 and Mode 2 is informed using saPeriod, saOffsetIndicator, and saBitmap broadcast in the SIB for the D2D UEs within the cell.

The Mode 1 communication data starts right after the end of the Mode 1 SA pool 11, but the Mode 2 communication data may not start right after the end of the Mode 2 SA pool 412. The Mode 2 data has the frequency axis pool defined with dataStartPRB, dataEndPRB, and dataNumPRB and the time axis resource pool defined with dataPeriod, dataOffsetIndicator, and dataBitmap (Mode 2 data pool) 430. However, the Mode 1 data has not data resource pool defined. The Mode 2 communication may operate in a fallback mode in the coverage area of the eNB. That is, although it is typical that the D2D communication operates in Mode 1 in the eNB coverage, the D2D communication may operate in Mode 2 in a special situation, e.g., the synchronization signal of the eNB may not be received according to an eNB command for a predetermined time period in an emergency operation. For such case, there may be a need of the dedicated resource for Mode 2 communication. Accordingly the resource allocation method of FIG. 4A is appropriate for supporting such fallback mode operation.

The D2D UEs decodes the communicationPoolType received through the SIB from the eNB to acquire the resource pool information on the respective modes, i.e., the UE receives and decodes the SIB to acquire the information on the time/frequency position of the Mode 1 SA pool and time/frequency position of the Mode 2 SA pool. The communicationPoolType transmitted in the SIB may be managed implicitly or explicitly with 1-bit or 2-bit signaling as follows.

(1) Implicit management of communicationPoolType: The frequency resource indicated by asStartPRB and saNumPrb is recognized as the Mode 1 SA resource pool 411, and the frequency resource indicated by saEndPRB and saNumPRB is recognized as the Mode 2 SA resource pool 412. The reverse case is possible and, in this case, the saNumPRB for Mode 1 and saNumPRB for mode 2 may be set to different values or the same value for reducing signaling overhead.

(2) Explicit management of communicationPoolType: It is carried in the SIB transmitted by the eNB as 1-bit signal set to 0 for Mode 1 SA resource or 1 for Mode 2 SA resource pool. Also, this parameter may be set to 1 for Mode 1 SA resource and 0 for Mode 2 SA resource pool. In each communication mode, saStartPRB, saNumPRB, and saEndPRB may exist. Although not shown in FIGS. 4A and 4B, if such a signaling is used, there may be two SA resource pools for each of Mode 1 and Mode 2. That is, there may be 4 frequency axis resource pools in the same time axis SA pool.

For example, there is two resource pools indicated by saStartPRB and saNumPRB in the Mode 1 resource pool and two resource pools indicated identically in the Mode 2 resource pool. The frequency axis resource pools in the same mode can be used in different groups. For example, the firefighter group and the police group may use different frequency axis resource pools in Mode 2.

In a case of suing 2-bit signaling, it can be indicated as the communicationPoolType={00, 01, 10, 11}. In FIG. 4A, if the Mode 1 SA resource pool is indicated by 0 and the Mode 2 SA resource pool is indicated by 1, the SA resource pool is indicated by signaling communicationPoolType=01.

In the FIG. 4A, the Guard Band is set to avoid the ICI problem occurring between RBs using different transmission reference timings. For example, the SAs for Mode 1 and Mode 2 are transmitted in compliance with the downlink reference timing in the SA resource pool while the cellular source (WAN) is transmitted in compliance with the downlink reference timing. Likewise, in a case where the Mode 2 data is transmitted in compliance with the downlink reference timing, the guard band is set to avoid the ICI problem with the cellular resource (WAN) or Mode 1 data transmitted in compliance with the uplink reference timing.

In a case where the Mode 2 data is transmitted in compliance with the uplink reference timing, it is not necessary to set the Guard band. Meanwhile, in the SA resource pool, the cellular resource (WAN) may be used as FDM'ed with the Mode 1 SA resource pool and Mode 2 SA resource pool or not. In this case, it is not necessary to set the guard band explicitly between the Mode 1 SA resource pool and the cellular resource (WAN) and between the Mode 2 SA resource pool and the cellular resource (WAN).

Referring to FIG. 4B, another embodiment of the present disclosure is illustrated, in which Mode 1 SA and the Mode 2 SA are FDM'ed unlike a case of FIG. 4A in which the Mode 1 SA pool and Mode 2 SA pool are arranged separately on the frequency axis. Thus, there is no need to transmit the communicationPoolType in the SIB. In a case of using the Mode 1 communication and Mode 2 communication, the Tx D2D UEs operate per Mode in the SA resource pool. That is, all D2D UEs receives the time axis information of the SA resource pool which includes saPeriod, saOffsetIndicator, and saBitmap; and the frequency axis information of the SA resource pool which includes saStartPRB, saEndPRB, and saNumPRB.

Among the D2D UEs received the information, the Tx D2D UE using the Mode 1 communication is allocated the time/frequency resource for SA transmission through DCI of PDCCH. The SA carries the time/frequency position of the SA resource and T-RPT of the data resource included in the DCI information frequency resource allocation, and frequency axis size of the data resource. The Rx D2D UE using the Mode 1 communication acquires the data resource allocation information included in the SA to decode the data at the corresponding resource position.

The Tx D2D UE using the Mode 2 communication selects resource from the SA and data resource pool indicated in the SIB from the eNB autonomously. For example, the eNB may select the unoccupied SA resource in the SA resource pool in an energy sensing manner. After decoding all RBs existing in the SA resource pool, the UE may select available SA resource. The UE selected the SA resource available in Mode 2 selects the T-RPT and frequency resource for data transmission randomly and transmits the data along with the SA information. At this time, the T-RPT and frequency resource for data transmission should be defined in the Mode 2 data resource pool. The Mode 2 communication Rx UE receives and decodes SA resource and then decodes the data using the T-RPT included in the SA resource and frequency resource position of the data. Accordingly, there is no need of the communicationPoolType information transmitted in SIB in a case of FIG. 4B.

Figure 5:
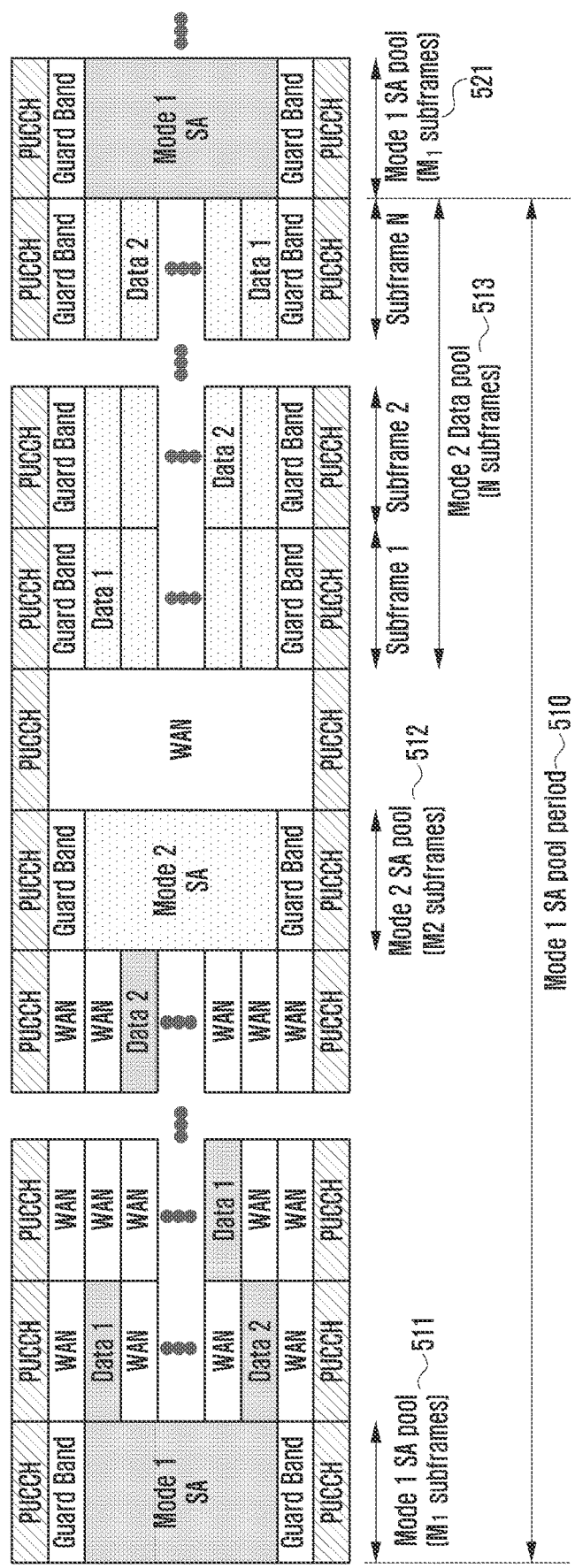
FIG. 5 is a diagram illustrating a resource allocation for a time division multiplex (TDM) of an SA and data according to an embodiment of the present disclosure.

FIG. 5 is a diagram illustrating a resource allocation for a TDM of an SA and data according to an embodiment of the present disclosure.

Referring to FIG. 5, an SA resource pool 511 and an SA resource pool 512 are illustrated, where the SA resource pool 511 is of Mode 1 and the SA resource pool 512 is of Mode 2 and the SA resource pool 511 and the SA resource pool 512 are TDM'ed in a Mode 1 SA pool period 510.

In the Mode 2 communication, the eNB broadcast dataPeriod, dataOffsetIndicator, and dataBitmap in an SIB to communicate the time axis information of the data resource pool. At this time, the dataBitmap information indicates subframes with mode 2 D2D resource. For example, the dataBitmap set to 1011011 . . . informs that subframe 1, subframe 3, subframe 4, subframe 6, and subframe 7 have mode 2 D2D resource. At this time, if the Mode 2 Tx UE has selected T-RPT of 10110 randomly for data transmission, this means that the Tx UE A transmits data at subframe 1, subframe 4, and subframe 6. In order to reduce signaling overhead, the dataBitmap and TORPt may use repetitive transmission. For example, if the Mode 2 data resource pool 513 consists of N subframes, it may be possible to configure the n-bit default dataBitmap and repeat the n-bit dataBitmap Q times to meet (n×Q)≤N.

Such information is carried in the SIB broadcast by the eNB. Particularly in a case where different SA resource pools 511 and 512 are TDM'ed with a Mode 2 data resource pool 513 as shown in FIG. 5 (including 2 or more Mode 2 SA resource pools although not shown in FIG. 5), the Mode 2 data resource pool 513 may collide with a subsequent Mode 1 SA resource pool 521 or Mode 2 SA resource pool (not shown). In order to avoid this, it is required to design such that the product of the repetition times of dataBitmap (R) and the size of the dataBitmap (n) becomes less than saPeriod. For example, assuming saPeriod={80, 160, 320}ms and dataBitmap size of Mode 2 data=40 ms (40 bits), it is designed to be less than R={1, 3, 7} for respective saPeriod values.

Figure 6:
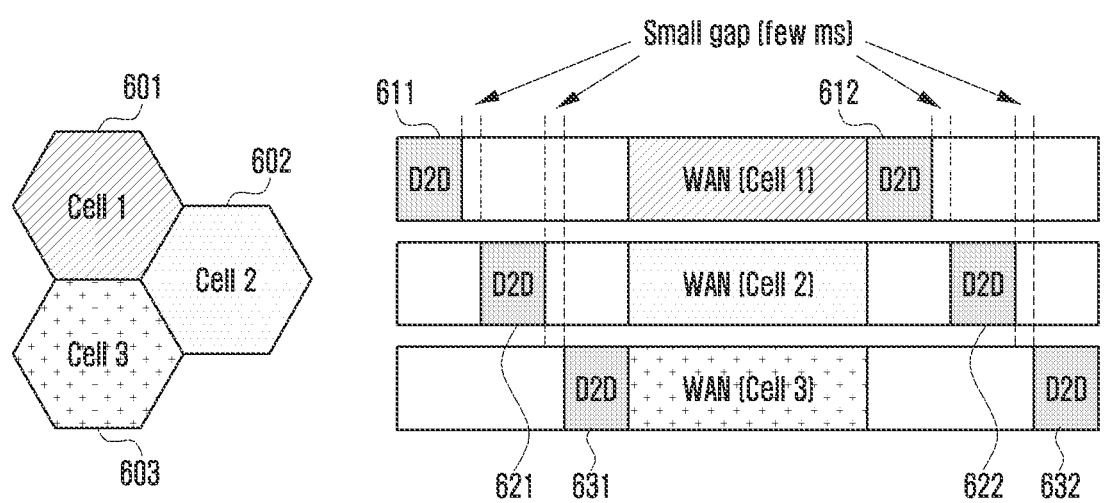
FIG. 6 is a diagram illustrating resource allocation for an inter-cell D2D discovery according to an embodiment of the present disclosure.

FIG. 6 is a diagram illustrating resource allocation for an inter-cell D2D discovery according to an embodiment of the present disclosure.

Referring to FIG. 6, eNBs 601, 602 and 603 are illustrated, where the eNBs 601, 602, and 603 notify D2D UEs connected to their cells of the information on the discovery resource pool used in the neighboring cell as well as the information on its own D2D discovery resource pool through an SIB.

If such information is received, the UE receives the D2D signal transmitted in the discovery resource pool of the serving cell and the discovery resource pool of the neighboring cell. For example, the D2D UEs of cell 1 601 receive the D2D discovery signals transmitted in the D2D discovery resource pools of cell 2 602 and cell 3 603 as well as cell 1 601.

Meanwhile, the D2D discovery Tx UE of cell 1 601 transmits the D2D discovery signal only in the discovery transmission resource pool available for its cell but not in the discovery transmission resource pool of the neighboring cells 602 and 603.

In a case of Type 1 discovery, it is determined that the D2DSS and discovery message are transmitted in compliance with the downlink timing. In a case of Type 2B discovery, however, nothing is determined yet. In a case of Type 2B discovery, various scenarios can be considered as shown in table 1.

TABLE 1

| Scenario | D2DSS Tx reference timing | Type 2B discovery message Tx reference timing |
|---|---|---|
| 1 | Downlink timing | Downlink timing |
| 2 | Downlink timing | Uplink timing |
| 3 | Uplink timing | Uplink timing |

In a case of scenario 1 of table 1, the Type 2B discovery D2DSS transmission reference timing and Type 2B discovery message transmission reference timing are identical with the Type 1 discovery D2DSS and Type 1 discovery message transmission reference timing. Thus, no signaling is required for communicating the transmission reference timing. That is, it is not required to transmit the maximum offset information through SIB or dedicated RRC signaling. This means that it is not necessary for the Rx D2D UE in the RRC_Idle state to move up the receiving window earlier than the downlink reference timing which it has received for receiving the D2DSS or Type 2B discovery message. In a case where the Type 2B discovery message is frequency-multiplexed with the cellular PUSCH, significant ICI problem may occur at the reception front end of the eNB and D2D reception front end.

In a case of scenario 2, the D2D UE has to know that the Type 2B discovery message is transmitted in compliance with the uplink timing. Such information can be transmitted with a 1-bit signal through SIB or dedicated RRC signaling. That is, all D2D UEs received the SIB within the cell know that the discovery message should be transmitted in compliance with the uplink reference timing in the Type 2B discovery resource pool. Since the Tx D2D UE is in the RRC_Connected state in the Type 2B discovery, the eNB may command the Tx D2D UE to transmit the Type 2B discovery message in compliance with the uplink reference timing. At this time, the eNB may command the Tx D2D UE to transmit the D2DSS which is preconfigured to be transmitted according to the downlink reference timing.

If it is specified to transmit the D2DSS in compliance with the downlink reference timing always and the Type 2B discovery message in compliance with the uplink reference timing always in the standard, the information may be mapped to the Type 2B resource pool allocation information. For example, assuming that the resource pool 1 is used for Type 1 discovery and the resource pool 2 is used for Type 2B discovery, the Tx D2D UE transmits the D2DSS and the Type 1 discovery message in compliance with the downlink resource timing in the resource pool 1. The Tx D2D UE may also transmit the D2DSS in compliance with the downlink reference timing and the Type 2B discovery message in compliance with the downlink reference timing in the resource pool 2. Meanwhile, in order for the Rx D2D UEs in the RRC_IDLE state to receive, in the serving cell and neighboring cell, the Type 2 discovery message transmitted in compliance with the uplink timing, the serving eNB has to communicate the maximum TA information of the serving cell and neighboring cells through SIB or PD2DSCH.

If it is specified to transmit the D2DSS in compliance with the downlink reference timing always and the Type 2B discovery message in compliance with the uplink reference timing always in the standard, the information may be mapped to the Type 2B resource pool allocation information. For example, assuming that the resource pool 1 is used for Type 1 discovery and the resource pool 2 is used for Type 2B discovery, the Tx D2D UE transmits the D2DSS and the Type 1 discovery message in compliance with the downlink resource timing in the resource pool 1. The Tx D2D UE may also transmit the D2DSS in compliance with the downlink reference timing and the Type 2B discovery message in compliance with the downlink reference timing in the resource pool 2.

Meanwhile, in order for the Rx D2D UEs in the RRC_IDLE state to receive, in the serving cell and neighboring cell, the Type 2 discovery message transmitted in compliance with the uplink timing, the serving eNB has to communicate the maximum TA information of the serving cell and neighboring cells through SIB or PD2DSCH.

Finally, in a case of scenario 3, the D2D UE has to know that the D2DSS and Type 2B discovery message are transmitted in compliance with the uplink timing. It can be transmitted with a 1-bit signal through SIB or dedicated RRC signaling. That is, all D2D UEs received the SIB within the cell know that the D2DSS and discovery message should be transmitted in compliance with the uplink reference timing in the Type 2B discovery resource pool.

Since the Tx D2D UE is in the RRC_Connected state in the Type 2B discovery, the eNB may command the Tx D2D UE to transmit the Type 2B discovery message in compliance with the uplink reference timing. At this time, the eNB may command the Tx D2D UE to transmit the D2DSS which is supposed to be transmitted in compliance with the uplink reference timing. If it is specified to transmit the D2DSS and discovery message in the Type 2 discovery in compliance with the uplink reference timing always in the standard, the information may be mapped to the Type 2B resource pool allocation information.

For example, assuming that the resource pool 1 is used for Type 1 discovery and the resource pool 2 is used for Type 2B discovery, the Tx D2D UE transmits the D2DSS and the Type 1 discovery message in compliance with the downlink resource timing in the resource pool 1. The Tx D2D UE may also transmit the D2DSS and discovery message in compliance with the uplink reference timing in the resource pool 2. Meanwhile, in order for the Rx D2D UEs in the RRC_IDLE state to receive, in the serving cell and neighboring cell, the D2DSS and Type 2 discovery message transmitted in compliance with the uplink timing, the serving eNB has to communicate the maximum TA information of the serving cell and neighboring cells through SIB. The Rx D2D UEs received the information search for the start point of the resource pool based on the D2DSS and then receives the Type 2B discovery message. In a case of transmitting the maximum TA information through the SIB, since the Rx UE does not know the TA information of the Tx UE, it should be in the Rx mode for time duration long enough to configure the D2DSS reception window. That is, the Rx UE has to enter the RX mode earlier as much as 9 SC-FDM symbols than its downlink reference timing.

Furthermore, referring to FIG. 6 D2D resources 611 and 612 of the cell 1 601, D2D resources 621 and 622 of the cell 2 602 and the D2D resources 631 and 632 of the cell 3 603 are illustrated, where the D2D resources 611 and 612 of the cell 1 601, the D2D resources 621 and 622 of the cell 2 602, and the D2D resources 631 and 632 of the cell 3 603 may be separated with gaps of a few ms. Since the reason for use of the gaps has been described above in association with the phenomenon occurring in the asynchronous network, detailed description thereof is omitted herein.

Figure 7A:
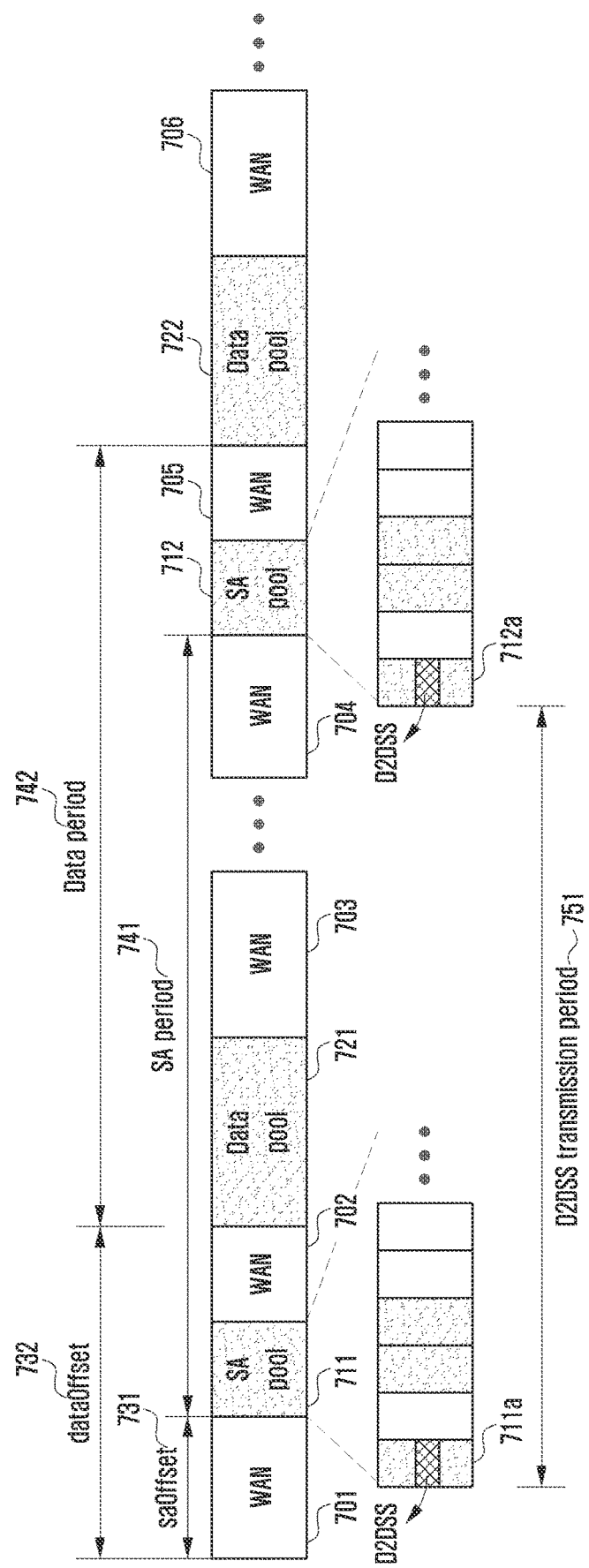
Figure 7B:
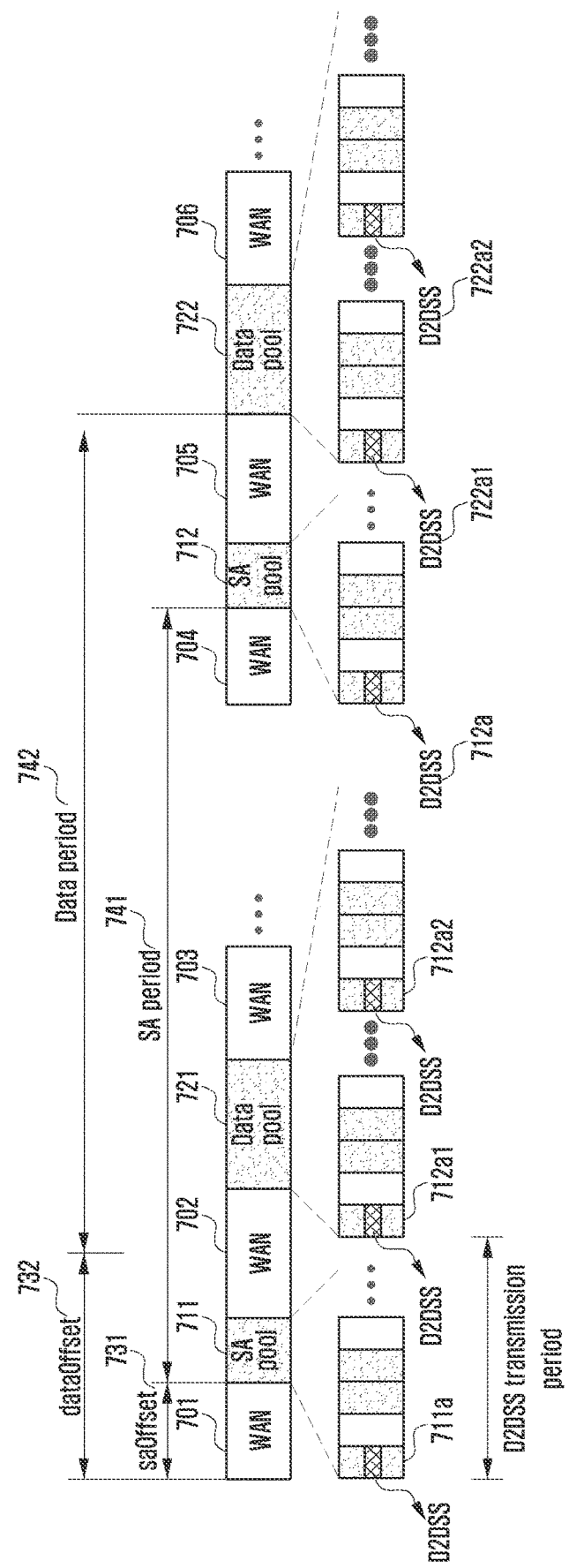

FIGS. 7A to 7C are diagrams illustrating D2DSS Tx resource allocation for an inter-D2D communication according to various embodiments of the present disclosure.

Referring to FIG. 7A to 7C, similar to inter-cell D2D discovery, an eNB of each cell notifies D2D UEs connected thereto of SA resource pool information and data resource pool information on the communication used in the neighboring cell as well as the SA resource pool and data resource pool information on the D2D communication used in its cell through an SIB. The UE which has received this information receives the D2D signal transmitted in the SA/data resource pool of the serving cell and the SA/data resource pool of the neighboring cell. For example, the D2D UE located in cell 1 601 of FIG. 6 receives the D2D communication signal transmitted in the SA/data resource pool of the cell 2 602 and cell 3 603 as well as cell 1 601.

Meanwhile, the D2D communication Tx UE of cell 1 601 transmit the D2D communication signal only in the SA/data transmission resource pool available for its cell but not in the communication transmission resource pool of the neighboring cell. That is, the UE performs only signal reception in the transmission resource pool of the neighboring cell.

Unlike the D2D discovery, the D2D communication should be supported in a partial coverage situation. The partial coverage situation is the situation in which some D2D UEs are located in the coverage area of the eNB while some D2D UEs are located out of coverage area of the eNB. This means that the eNB may be damaged by natural disaster such as earthquake and tsunami, fire, or terror. In such a situation without presence of eNB, periodic D2DSS transmission is required for synchronization among the UEs. The D2DSS transmission resource may be predetermined as shown in FIGS. 7A and 7B or may be communicated under the configuration of the eNB as shown in FIG. 7C.

First, descriptions are made of the resource structures of FIGS. 7A to 7C schematically.

FIGS. 7A to 7C show resource structures identical in transmission format. That is, LTE cellular network transmission resources 701, 702, 703, 704, 705 and 706, SA resource pools 711 and 712, and data pools 721 and 722 are TDM'ed. The resource allocation information to indicate such resource configuration may be transmitted through an SIB as described above. At this time, saOffset 731 indicates a start point of the SA resource pool 711 from SFN 0, and dataOffset 732 indicates the start point of the data resource pool 721 from SFN 0. The SA period 741 and data period 742 indicate the respective discovery periods.

A description is made of the D2DSS transmission hereinafter with reference to FIGS. 7A to 7C. As shown in FIG. 7A, the D2DSS may always be transmitted at the start point of the SA resource pool. This is a case where the D2DSS is transmitted at first subframes 711a and 712a of the SA resource pools 711 and 712. In this case, there is no need of extra signaling for D2DSS transmission resource configuration. In a case where the period of the SA resource pool 741 is long, however, the transmission period 151 of the D2DSS is prolonged to cause synchronization error, resulting in performance degradation.

Meanwhile, the D2DSS may be transmitted periodically at the start point of the SA resource pools 711 and 712 and in the D2D data resource pool 721 and 722 following the SA as shown in FIG. 7B, as denoted by reference numbers 721a1, 721a2, 722a1 and 722a2. For this purpose, the eNB may signal the transmission period of the D2DSS through an SIB or dedicated RRC signaling. The UE located in the coverage area of the eNB may relay the transmission period of the D2DSS through PD2DSCH to the UEs located out of the coverage area of the eNB. Since the method of FIG. 7B can set a short D2DSS transmission period in comparison to the method of FIG. 7A, it is advantageous in terms of improving the synchronization performance but disadvantageous in that the D2DSS Tx UE cannot receive SA or data even in the subframe carrying the D2DSS due to the half-duplexing problem. That is, since the D2DSS Tx UE cannot receive signals in the Tx mode, it cannot receive the SA and data transmitted by other D2D UEs in the D2DSS subframe.

In order to overcome this shortcoming, the eNB may configure the resource for D2DSS transmission in the WAN cellular subframe as shown in FIG. 7C. The RBs with the exception of the D2DSS transmission resource (e.g., center 6 RBs) can be used for transmitting cellular uplink data and control information. That is, since the WAN subframes 701, 702, 703, 704, 705 and 706 are used for transmitting cellular data and control information, the D2D UEs do not transmit or receive therein. Accordingly, it is required for the eNB to notify the D2D UEs within the cell of the D2DSS transmission in the WAN subframes 701, 702, 703, 704, 705 and 706 and its transmission period through an SIB. For example, the D2DSS may be transmitted in a subframe 701a predetermined in the first WAN resource pool 701 as shown in FIG. 7C. Furthermore, the D2DSS transmission resource information should be relayed to the out-of-coverage UEs through PD2DSCH for D2DSS transmission in the corresponding subframe.

The operations of FIGS. 7A, 7B, and 7C may be performed independently or in various combination. That is, the D2DSS may be transmitted in the SA resource pool and WAN resource pool, or in the SA resource pool, data resource pool, and WAN resource pool. In order to achieve this, the eNB may notify the D2DSS Tx UEs of the information on the resource pool for D2DSS transmission through the SIB or dedicated RRC signaling.

In a case where the D2DSS is transmitted in the SA resource pool as shown in FIG. 7A, the D2DSS is transmitted in compliance with the downlink reference timing. Since the SA includes various control information for receiving data, even the RRC_Idle UE has to receive the SA. Thus it is specified to transmit the SA in compliance with the downlink reference timing. In order to avoid ISI or ICI with the SA, the D2DSS is transmitted in the SA resource pool in compliance with the downlink reference timing which is identical with the SA transmission reference timing.

In a case where the D2DSS is transmitted in both the SA resource pool and data resource pool as shown in FIG. 7B, the D2DSS transmission reference timing may be identical with the downlink reference timing or uplink reference timing. For example, in the Mode 1 communication, the SA is transmitted in compliance with the downlink reference timing, and the data is transmitted in compliance with the uplink reference timing. In order for the RRC_Idle UEs to receive data, the TA information of the Tx UE is informed in the SA. If this information is received, the RRC_Idle UEs move up the receiving window to the same extent as indicated by the TA in the SA to receive data. Accordingly, in the Mode 1 communication, the D2DSS is transmitted in compliance with the downlink reference timing in the SA resource pool and in compliance with the uplink reference timing in the data resource pool. Meanwhile, in the Mode 2 communication, the D2DSS is transmitted in compliance with the downlink reference timing.

In a case where the D2DSS is transmitted in the WAN resource pool as shown in FIG. 7C, the D2DSS is FDM'ed with the cellular data and control information transmitted in uplink. Since the uplink cellular data and control information are transmitted in compliance with the uplink reference timing (i.e., based on TA), if the D2DSS FDM'ed with them is transmitted in compliance with the downlink reference timing, this may cause ICI or ISI problem.

Accordingly, in a case of the D2DSS transmission in the WAN subframe, the D2DSS is transmitted in compliance with the uplink reference timing as in the WAN. In this case, however, the receiving window configuration method may occur at the RRC_Idle UE and thus it is necessary to notify the RX D2D UEs of the maximum TA value supported in the cell through the SIB. If there is not signaling of the TA value through the SIB, the Rx D2D UE moves up the receiving window earlier enough to receive the D2DSS and then perform the reception operation (e.g., it should be specified in the standard like 9 SC-FDM symbols). In order to mitigate signaling overhead and avoid the UE reception operation, the D2DSS may be transmitted in compliance with the downlink referencing timing and, at this time, it is necessary to set a guard band and guard time large enough to avoid the ISI and ICI to the WAN.

Figure 8:
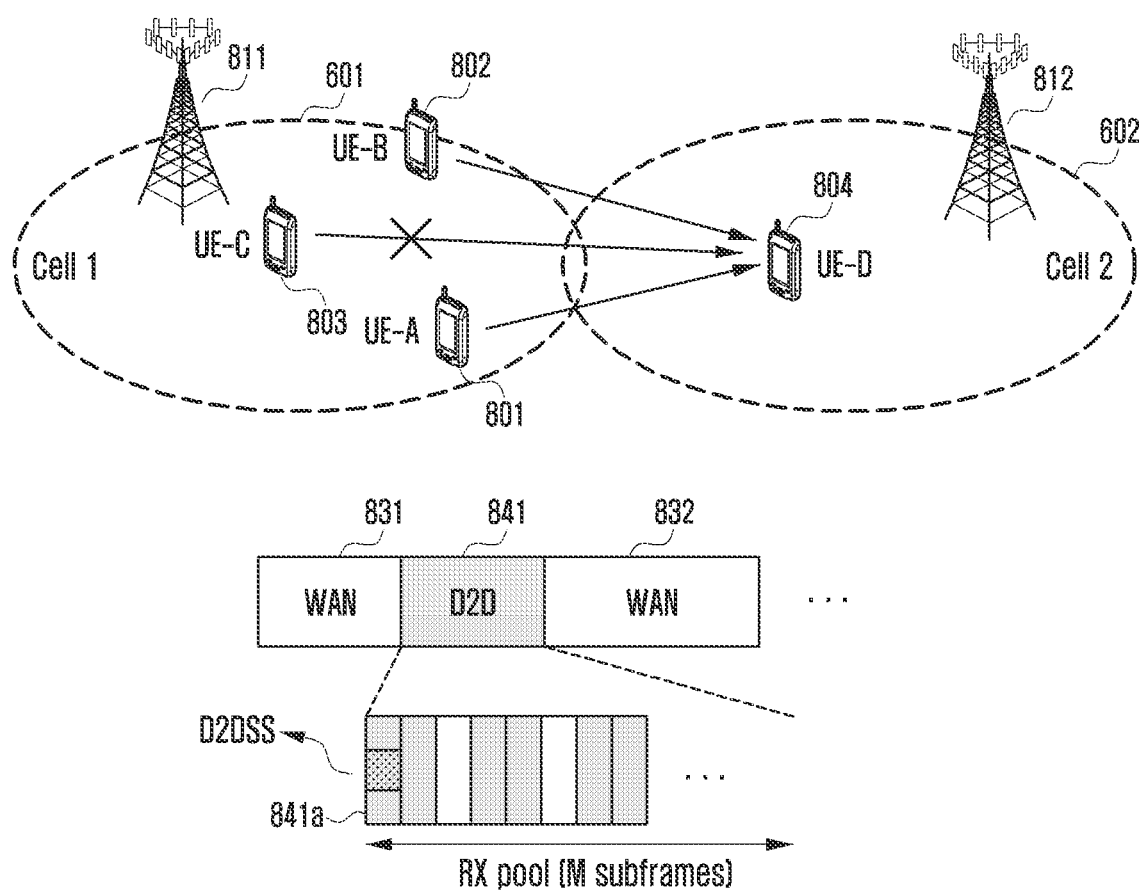
FIG. 8 is a conceptual diagram for explaining a D2D Tx user equipment (UE) selection operation according to an embodiment of the present disclosure.

FIG. 8 is a conceptual diagram for explaining a D2D Tx UE selection operation according to an embodiment of the present disclosure.

Referring to FIG. 8, it is assumed that three D2D communication-enabled UEs 801 (e.g., UE-A), 802 (e.g., UE-B), and 803 (e.g., UE-C), as illustrated, are located in a cell 1 601 of a first eNB 811 and one D2D communication-enabled UE 804 (e.g., UE-D) is located in a cell 2 602 of a second eNB 812. Although one UE 804 is depicted in the cell 2 202 in FIG. 8, there may be two or more D2D communication-enabled UEs in the cell 2 602.

The lower portion of FIG. 8 illustrates TDM'ed LTE communication resources 831 and 832 and a D2D resource pool 841. It is noted that the D2DSS is transmitted in a first subframe 841a of the D2D resource pool 841. The D2DSS may be transmitted as described with reference to FIGS. 7A to 7C.

In the Type 1 discovery, the D2DSS is transmitted at the first subframe of the transmission resource pool for supporting inter-cell D2D operation. For example, the D2D UEs 801, 802, and 803 of the cell 1 601 transmit D2DSS, and the UE 804 or other UEs (not shown) located in the cell 2 602 find the subframe boundary of the cell 1 D2D resource pool using the D2DSS transmitted by the UEs of the cell 1 601. After acquiring the subframe boundary, the D2D UE 804 of the cell 2 602 can receive the D2D signal from the cell 1 601 using the information on the cell 1 resource pool information transmitted by the cell 2 eNB 812 using an SIB. Accordingly, in the LTE environment in which the cells are not synchronized accurately, the D2DSS transmission and reception are inevitable to support inter-cell D2D operation.

At this time, there may be a problem of determining a UE to transmit D2DSS in each cell. For example, since the UE-C 803 of the cell 1 601 is near the eNB, although it transmits a D2DSS, the UE-D 804 of cell 2 602 cannot receive the D2DSS. Accordingly, it may cause unnecessary energy consumption for all UEs within the cell to transmit D2DSS.

Since it is required to design that the RRC_Idle UE can participate in the D2D transmission in the Type 1 discovery or Mode 2 communication, the UE may transmit the D2DSS under the triggering condition indicated in the SIB transmitted by the eNB. For example, the D2D UE measures the reference signal received power (RSRP) form the eNB and, if the measured RSRP is less than a threshold value X dBm, transmits the D2DSS. At this time, the value of X dBm may be informed through the SIB transmitted by the eNB.

In order to avoid the in-band emission problem occurring between the D2DSS and discovery message or WAN data/control information FDM'ed with the D2DSS, it may be refrained to use the maximum transmit power in transmitting the D2DSS. Depending on whether the D2DSS is transmitted at the maximum transmit power, the value of X dBm may change. If the D2DSS transmission trigger condition is based on the RSRP acquired by measuring the cell-specific reference signal (CRS) transmitted by the serving eNB of the D2D UE, it should be possible to set RSRP value differently depending on the cell radius of the eNB.

In the Type 2B discovery or Mode 1 communication, only the D2D UEs in the RRC_Connected state can transmit D2D signals. That is, in order for the D2D UE in the RRC_Idle state to perform D2D transmission, it has to transitions to the RRC_Connected state. Accordingly, in the Type 2B discovery or Mode 1 communication, the eNB may determine the UE to transmit the D2DSS. For example, In the Type 2B discovery (or Mode 1 communication), the eNB may command the UE to transmit D2DSS through RRC signaling.

Meanwhile, since the UE in the RRC_Connected state has acquired the TA information from the eNB, the eNB notifies the UE of the threshold value of the TA through RRC signaling such that the UE determines whether to transmit D2DSS autonomously as in the Type 2 discovery (or Mode 2 communication). However, if the UE determines to transmit D2DSS, it reports the determination result to the eNB for use in scheduling at the eNB scheduler.

Figure 9A:
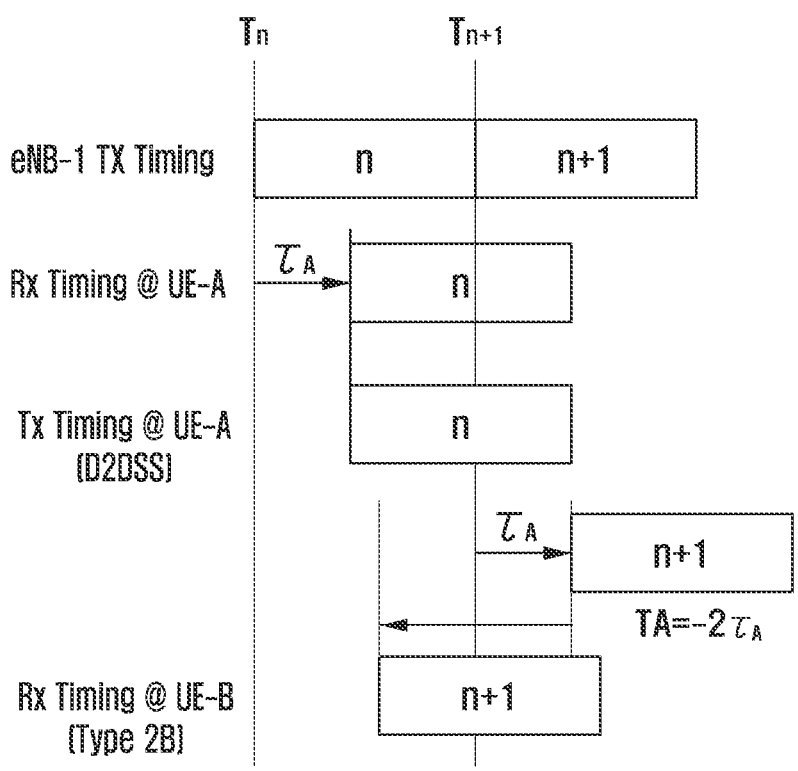
FIG. 9A is a timing diagram for explaining inter-symbol interference/inter-carrier interference (ISI/ICI) occurring when a UE-A transmits a Type 2B discovery according to uplink (UL) reference timing after transmitting a D2DSS according to downlink (DL) reference timing according to an embodiment of the present disclosure.
Figure 9B:
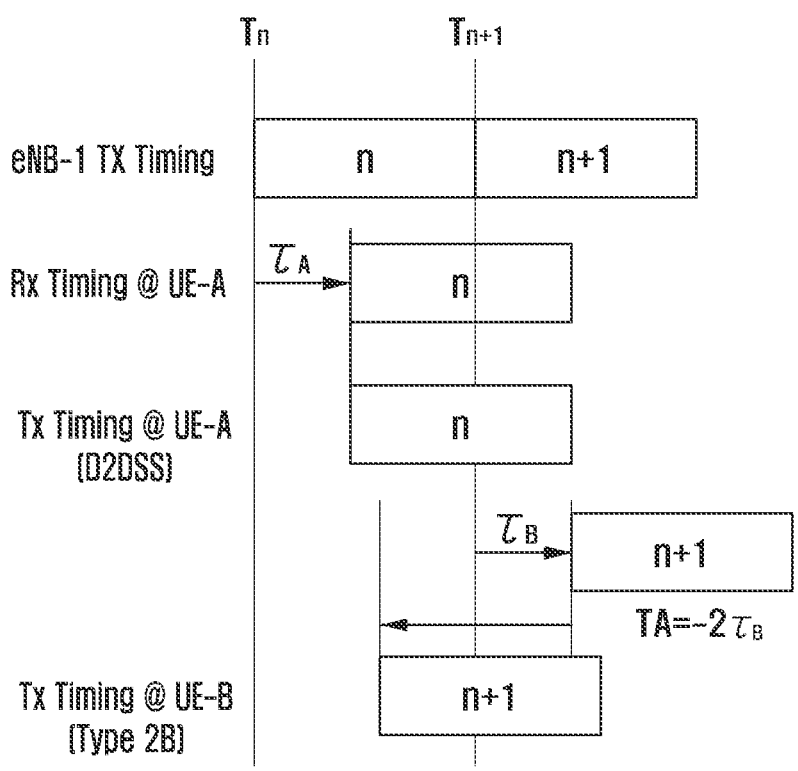
FIG. 9B is a timing diagram for explaining an ISI/ICI occurring when a UE-B transmits a Type 2B discovery according to UL reference timing after a UE-A transmits a D2DSS according to DL reference timing, according to an embodiment of the present disclosure.

FIG. 9A is a timing diagram for explaining ISI/ICI occurring when a UE-A transmits a Type 2B discovery according to UL reference timing after transmitting a D2DSS according to DL reference timing, and FIG. 9B is a timing diagram for explaining ISI/ICI occurring when a UE-B transmits a Type 2B discovery according to UL reference timing after a UE-A transmits a D2DSS according to DL reference timing.

In the Type 1 discovery, the D2DSS is transmitted at the first subframe of the transmission resource pool. However, there is no transmission resource pool in the Type 2B discovery. Accordingly, the D2DSS should be transmitted at the first subframe of the Type 2B discovery reception resource pool for D2D operation between the cells supporting the Type 2B discovery. At this time, if the D2DSS is transmitted in compliance with the uplink timing of the serving eNB and if the Type 2B discovery is transmitted in compliance with the uplink timing based on the TA, the ICI or ISI problem may occur between the D2DSS transmission frame and the Type 2B discovery transmission subframe occurring afterward.

Referring to FIG. 9A, a case is illustrated where the UE-A 801, as exemplified in FIG. 8, transmits the D2DSS at the $n^{th}$ subframe in compliance with the downlink reference timing and the Type 2B discovery message at the $(n+1)^{th}$ subframe in compliance with the uplink subframe. In FIGS. 9A and 9B, $T_n$ and $T_{n+1}$ denote the transmission timings of the cell 1 601 including the eNB 811 in the $n^{th}$ and $(n+1)^{th}$ subframes. These transmission timings are the times in view of the eNB and thus, in view of the UE, timings may vary depending on the distance from the first eNB 811. For example, the UE-A 801 may receive the $n^{th}$ subframe of the eNB at the timing determined by taking notice of the propagation delay of $\tau_A$, and the reception time may become the downlink reference timing. Accordingly, if the UE-A 801 transmits the D2DSS according to the downlink reference timing, it may be transmitted at the time delayed to the same extent as $\tau_A$. That is, the UE-A 801 transmits the D2DSS at the $n^{th}$ subframe corresponding to the time delayed to the same extent as $\tau_A$ from the transmission time of the eNB.

If the UE-A 801 transmits the Type 2B discovery message at the $(n+1)^{th}$ subframe based on the TA, the end part of the $n^{th}$ subframe and the start part of the $(n+1)^{th}$ subframe may be overlapped. This means ISI occurrence. In order to solve this problem, the following principals have been ratified in a 3GPP RAN1-76BIS meeting.

(1) The last symbol of every D2D subframe is emptied for the purpose of a Guard period (gap).

(2) In a case where a specific D2D UE transmits a D2D signal at the $n^{th}$ subframe without TA information (in compliance with DL timing) and the D2D signal or WAN signal at the $(n+1)^{th}$ subframe based on the TA information (in compliance with UL timing), if the TA value is greater than 1 symbol, it gives up the D2D signal transmission at the $n^{th}$ subframe.

In a case of applying the ratified principal to the D2DSS transmission without modification, if a specific D2D UE transmits a D2DSS at the $n^{th}$ subframe and a Type 2B discovery message at the $(n+1)^{th}$ subframe in compliance with the UL timing, it gives up the D2DSS transmission at the $n^{th}$ subframe when TA is longer than 1 symbol. Since the D2DSS transmission is inevitable to supporting inter-cell D2D operation in the asynchronous network environment, the following methods can be proposed to solve such a problem.

(1) DL timing-based Type 2B discovery message transmission:

In a case of transmitting the Type 2 discovery message in compliance with the DL timing, it cannot be FDM'ed with the WAN data and control information transmitted in compliance with the UL timing.

(2) UL timing-based Type 2B discovery message transmission:

If a D2D UE having TA longer than 1 symbol transmits a D2DSS at the $n^{th}$ subframe in compliance with the DL reference timing, the eNB schedules such that the Type 2B discovery is not transmitted at the $(n+1)^{th}$ subframe.

The eNB transmits the maximum TA information of serving and neighboring cells through SIB or PD2DSCH in order for the RRC_Idle UE to receive the Type 2B discovery message.

(3) UL timing-based D2DSS transmission in Type 2B discovery:

It is easy to FDM with WAN data and control information.
There is no need of scheduling restriction of the eNB and operation restriction of the D2D UE.

The eNB transmit the maximum TA information of the serving and neighboring cells using an SIB in order for the RRC_Idle UE to receive the D2DSS and Type 2B discovery message.

Referring to FIG. 9B, a case is illustrated where the UE-A 801, as exemplified in FIG. 8, transmits the D2DSS at the $n^{th}$ subframe in compliance with the DL reference timing and the UE-B transmits the Type 2B discovery message at the $(n+1)^{th}$ subframe in compliance with the UL reference timing. That is, the UE-A 801 is scheduled to transmit the D2DSS at the $n^{th}$ subframe, since TA is longer than 1 symbol, but not transmit the Type 2B discovery message at the $(n+1)^{th}$ subframe.

Meanwhile, the UE-B 802, as exemplified in FIG. 8, is scheduled not to transmit the D2DSS at the $n^{th}$ subframe but transmit the Type 2B message at the $(n+1)^{th}$ subframe. In this case, the ICI/ISI problem may occur between the D2DSS transmitted at the $n^{th}$ subframe and the Type 2B discovery message transmitted at the $(n+1)^{th}$ subframe. In order to solve this problem, it can be considered to set a gap (1subframe) large enough. That is, the $(n+1)^{th}$ subframe can be used as the gap between the $n^{th}$ subframe carrying the D2DSS and the $(n+2)^{th}$ subframe carrying the Type 2B discovery message. Since the gap of 1 subframe causes resource utilization inefficiency, it can be considered to use the $(n+1)^{th}$ subframe as dedicated WAN subframe. Accordingly, the bitmap of the Type 2B reception pool always start with 10.

Figure 10:
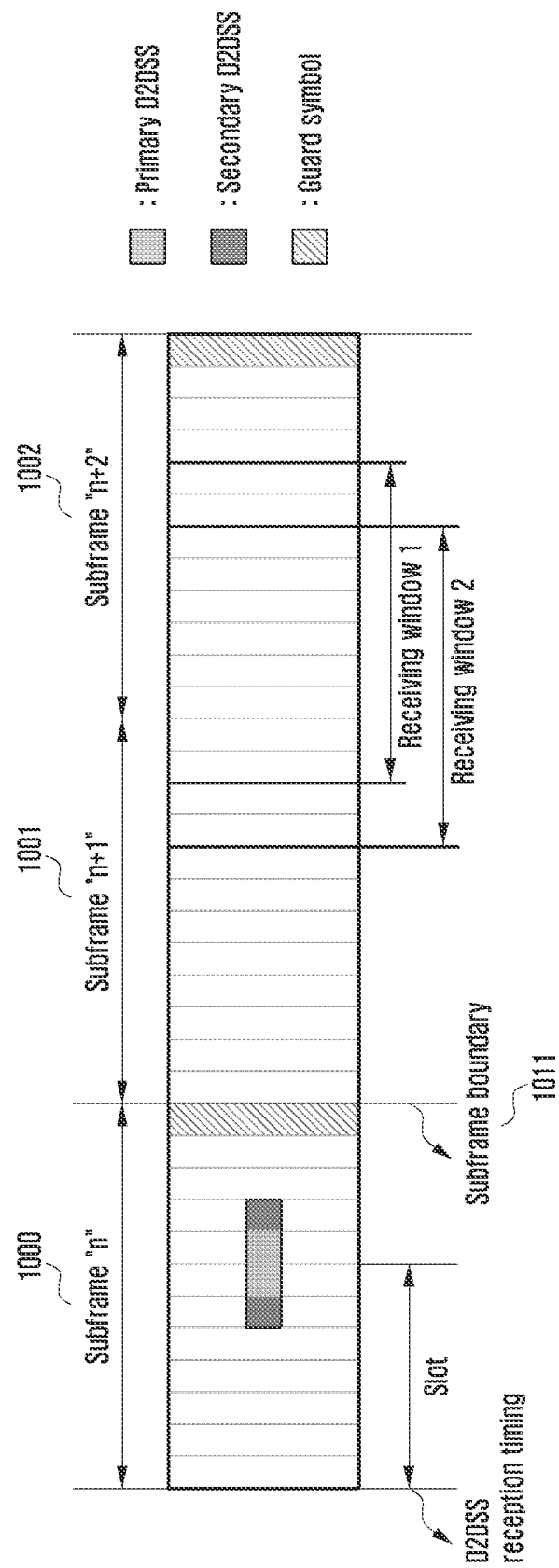
FIG. 10 is a diagram for explaining a problem occurring when a neighboring cell Rx UE receives a D2DSS in a Type 2B discovery and then receives a Type 2B discovery message transmitted in compliance with UL timing according to an embodiment of the present disclosure.

FIG. 10 is a diagram for explaining a problem occurring when a neighboring cell Rx UE receives a D2DSS in a Type 2B discovery and then receives a Type 2B discovery message transmitted in compliance with UL timing according to an embodiment of the present disclosure.

Referring to FIG. 10, a UE-D located in a neighboring cell 2 602, as illustrated in FIG. 8, receives a D2DSS transmitted from the cell 1 601, as illustrated in FIG. 8, in compliance with DL timing and then acquires the start point of a Type 2B discovery subframe and slot boundary 1011 of the neighboring cell.

The UE located in the cell 1 601 transmits the Type 2B discovery message based on its TA value in compliance with the UL timing. Since the Rx D2D UE (UE-D) 804, as illustrated in FIG. 8, of the neighboring cell 2 602 does not know the TA value, it cannot configure its receiving window.

One method for solving this problem is that the UE which has received the D2DSS at the $n^{th}$ subframe 1000 configures the receiving window starting from the start point of the $(n+1)^{th}$ subframe 1001 to receive the Type 2B discovery message. However, this message may cause discovery signal reception operation inefficiency. This is because the Rx UE which does not know the TA information of the neighboring cell configure the receiving window under the assumption of the maximum TA (cell radius of 100 km). For example, even though the cell radius of the neighboring cell is less than 1 km, the Rx D2D UE which does not know it configures the receiving window under the assumption of the cell radius of 100 km. Receiving windows 1 and 2 extend to a $(n+2)^{th}$ subframe 1002, so as to extend across the $(n+1)^{th}$ subframe 1001 and the $(n+2)^{th}$ subframe 1002.

In the present disclosure, the maximum TA value of the serving and neighboring cells are transmitted through SIB or PD2DSCH such that the Rx D2D UEs located in the serving and neighboring cells can receive the maximum TA value and adjust the receiving window based on the TA value indicated in the SIB or PD2DSCH.

Figure 11:
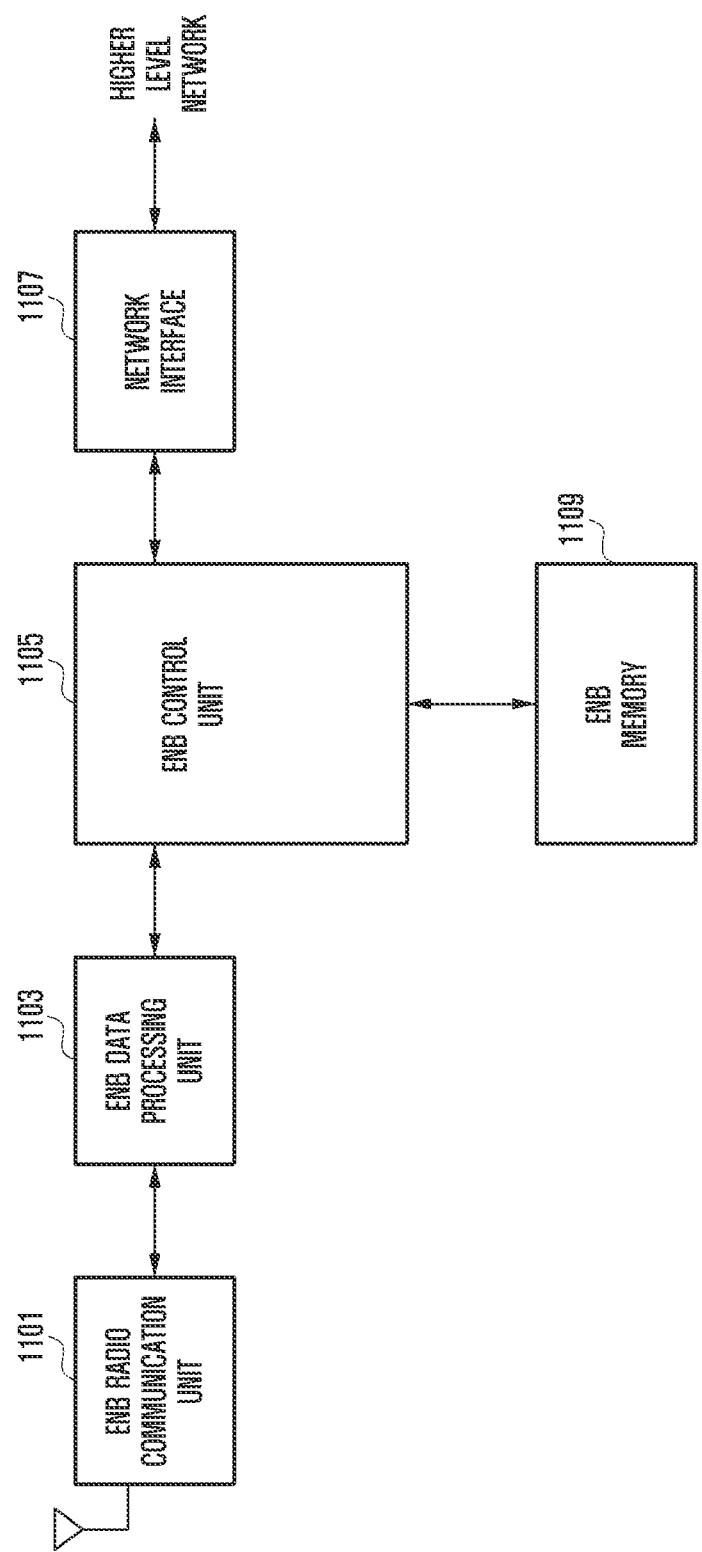
FIG. 11 is a block diagram illustrating a configuration of an e-Node B (eNB) according to an embodiment of the present disclosure

FIG. 11 is a block diagram illustrating a configuration of an eNB according to an embodiment of the present disclosure.

Referring to FIG. 11, an eNB is illustrated, where the eNB may include an eNB radio communication unit 1101, an eNB data processing unit 1103, an eNB control unit 1105, a network interface 1107, and an eNB memory 1109.

The eNB radio communication unit 1101 may be a module for transmitting and receiving data to and from at least one UE located in its coverage through a radio channel. The eNB radio communication unit 1101 may up-convert the data or signals into a radio frequency (RF) band signal suitable for transmission through an antenna. At this time, the antenna may be comprised of a plurality of antennal elements. Although FIG. 11 shows just the functional block configuration, the present disclosure is not limited thereto. The eNB radio communication unit 1101 may down-convert the receive RF band signal into a baseband signal. The eNB radio communication unit 1101 may be configured with a component for detecting received signal strength, which may be provided to the eNB data processing unit 1103.

The eNB data processing unit 1103 may encode and demodulate the data required for communication with UE, such as SIB information which all UEs located in the coverage area of the eNB receive or which data addressed to a specific UE, in adaptation to the channel condition with the UE as described above. The eNB data processing unit 1103 also may forward the transmit power control information of the encoded and modulated signal which is provided by the eNB control unit 1105 to the eNB radio communication unit 1101.

Meanwhile, the eNB data processing unit 1103 may demodulate and decode the data received from the UE. At this time, if the data received from the eNB radio communication unit 1101 is analog data, the eNB data processing unit 1103 may include an analog/digital (A/D) converter for converting the analog data to digital data.

The eNB control unit 1105 may control the overall operation of the eNB, e.g., UE data scheduling operation (operation carried out by the scheduler), UE-specific channel power control operation, and data rate control operation. If it is necessary to communicate with a higher level network entity, the eNB control unit 1105 may communicate with the higher level network entity through a network interface 1107. If it is necessary for the eNB to communicate with a synchronized eNB or a specific neighboring eNB, the eNB control unit 1105 may communicate with the neighboring eNB using the network interface 1107 or a separate interface (not shown). Particularly when it is necessary for the D2D UEs to transmit/receive the D2DSS, the eNB control unit 1105 may control to provide the condition or command for the D2DSS transmission.

The network interface 1107 may provide an interface according to a communication protocol shared with a specific higher level network entity. The network interface 1107 may provide an interface with a neighboring eNB depending on case.

The eNB memory 1109 may include a region for storing specific information received from the higher level network entity or data generated as a result of the control operation of the eNB controller 1105 and another region for storing the program information necessary for the eNB control unit 1105 to execute the corresponding programs. The eNB memory 1109 may store the SIB information and UE capability information, e.g., whether the UE supports Type 1 communication or Type 2B communication, associated with the present disclosure.

Figure 12:
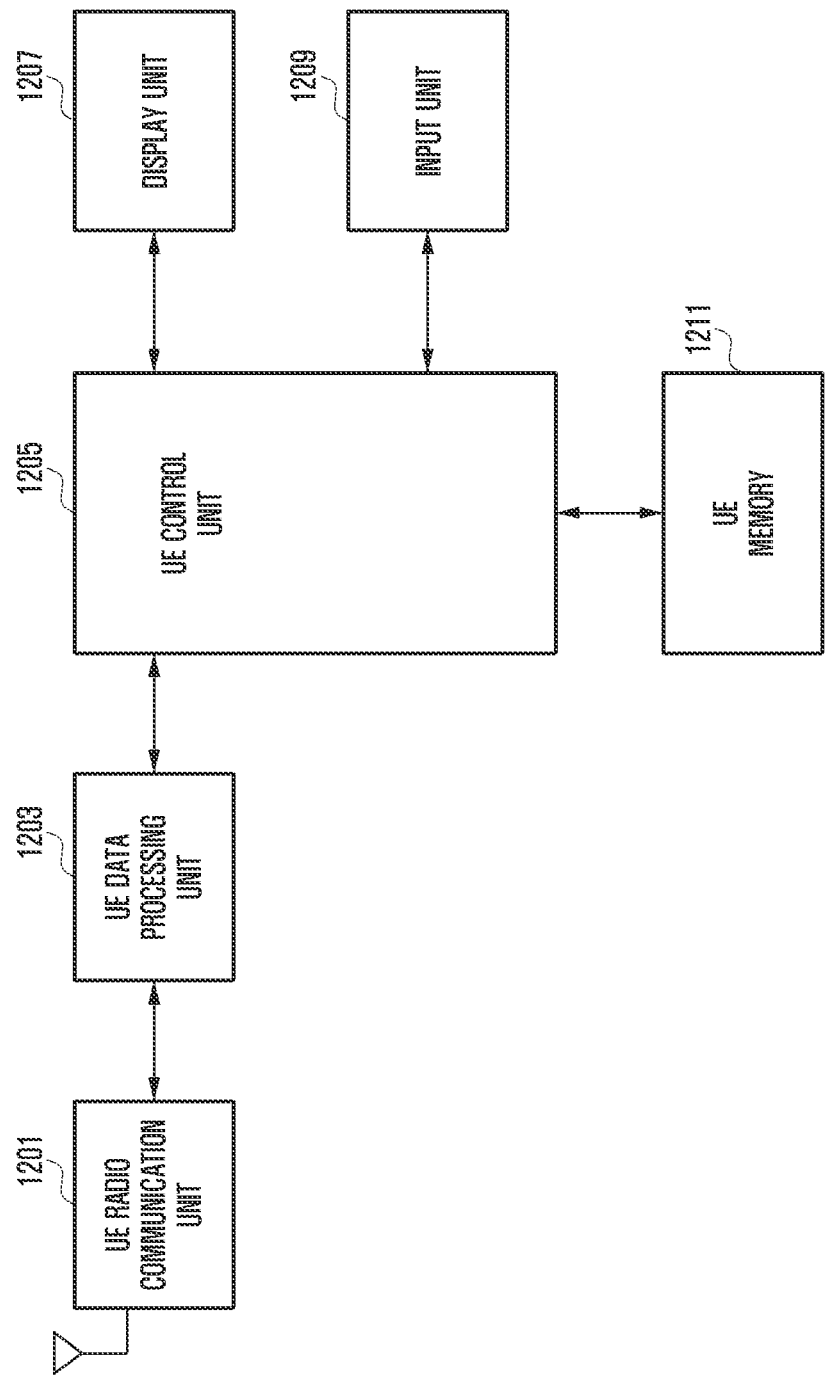
FIG. 12 is a block diagram illustrating a configuration of a D2D communication-enabled UE according to an embodiment of the present disclosure.

FIG. 12 is a block diagram illustrating a configuration of a D2D communication-enabled UE according to an embodiment of the present disclosure.

Referring to FIG. 12, a D2D communication-enabled UI is illustrated, where the D2D communication-enabled UE may include a UE radio communication unit 1201, a UE data processing unit 1203, a UE control unit 1205, a display unit 1207, an input unit 1209, and a UE memory 1211.

The UE radio communication unit 1201 may be a module for transmitting and receiving data to and from an eNB or a neighboring D2D UE through an RF channel. The UE radio communication unit 1201 may include a cellular communication module and a D2D communication module. The UE radio communication unit 1201 may include a component for detecting the received signal power depending on case, and the received signal power information may be provided to the UE data processing unit 1203.

The UE data processing unit 1203 may perform encoding/decoding and modulation/demodulation on the data to be transmitted to or received from an eNB or another D2D UE through a specific channel. The UE data processing unit 1203 may include an A/D converter for converting the analog data received by the UE radio communication unit 1201 to digital data.

The display unit 1207 may provide the user with a graphic interface to display the state of the UE and the user input.

The display unit 1207 may be implemented in various forms of light emission diodes (LED) and liquid crystal display (LCD), but without limitation thereto.

The input unit 1209 is an input module for receiving the input corresponding to the user request. The input unit 1209 may be provided in the form of a touch screen or a keypad or both. The input unit 1209 may include a voice recognition module for recognizing the user's voice.

The UE memory 1211 may include a region for storing data necessary for control and generating in control and another region for storing the data which the user requests for storing and information received from an eNB. The UE memory 1211 may include at least one of internal and external memories in the form of read only memory (ROM), random access memory (RAM), hard disk, or flash memory.

Figure 13:
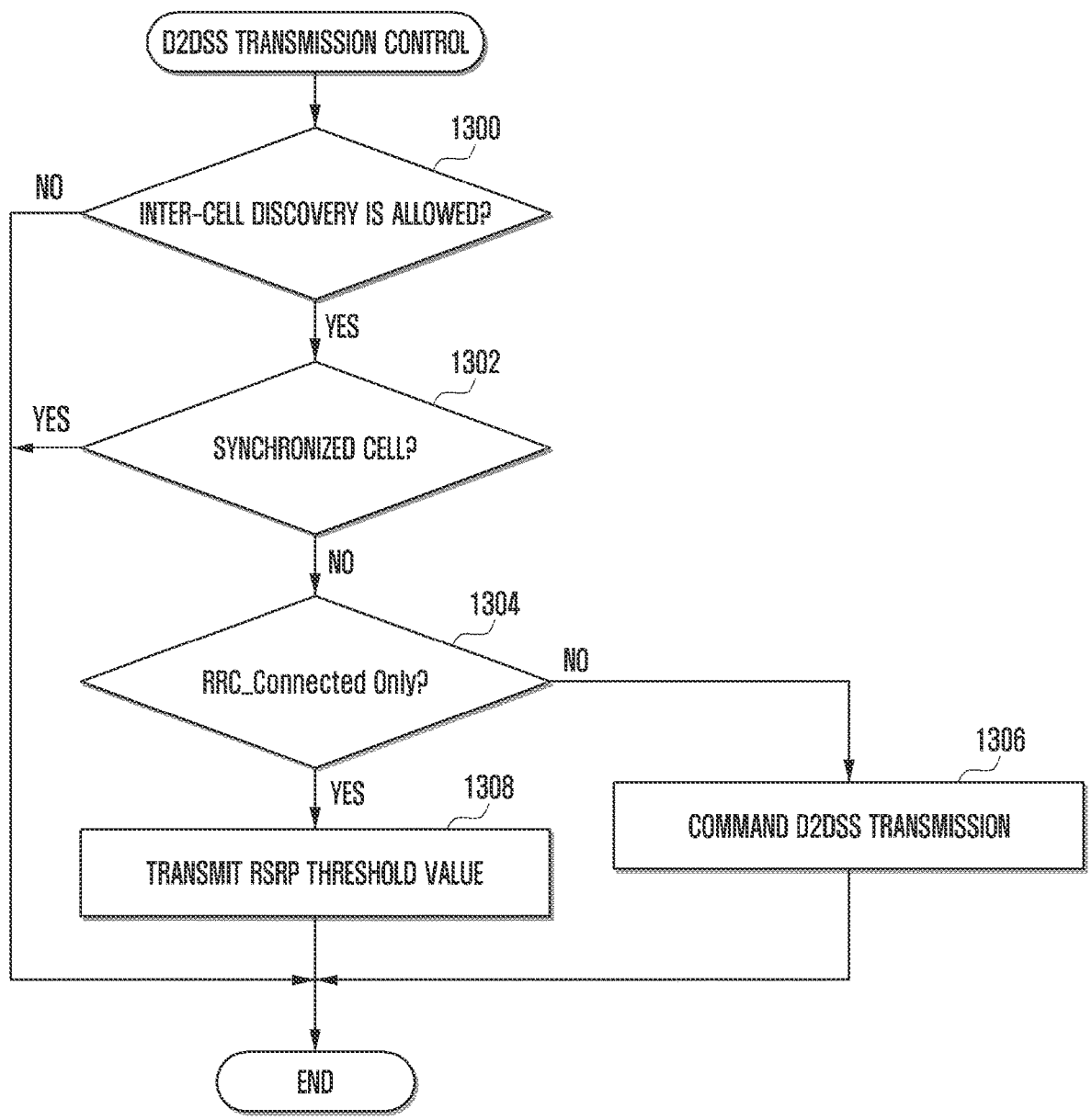
FIG. 13 is a flowchart illustrating a control procedure of an eNB for D2DSS transmission of a UE according to an embodiment of the present disclosure.

FIG. 13 is a flowchart illustrating a control procedure of an eNB for D2DSS transmission of a UE according to an embodiment of the present disclosure.

Referring to FIG. 13, a flowchart is illustrated, where the eNB control unit 1105, as illustrated in FIG. 11, determines whether the eNB allows D2D discovery between D2D UEs located in different cells (or inter-cell discovery) at operation 1300. The D2D discovery may be preset when the operator installs the eNB or according to the information provided by a higher level network entity.

If the inter-cell discovery is allowed at operation 1300, the procedure goes to operation 1302 and, otherwise if the inter-cell discovery is not allowed, the procedure ends.

At operation 1302, i.e., if the inter-cell discovery is allowed, the eNB control unit 1105 determines whether the corresponding cells are synchronized with each other. That is, the eNB control unit 1105 determine whether the cells are synchronized cells. Whether the cells are synchronized may be determined based on whether the inter-cell synchronization protocol (e.g., IEEE1588) is running or whether the eNB receives a synchronization signal from the global positioning system (GPS) (or a separate GPS receiver).

If the corresponding cells are not synchronized, the procedure goes to operation 1304 and, otherwise if the corresponding cells are synchronized, the procedure ends. As described above, if the corresponding cells are not synchronized, it is necessary for the UEs to transmit the D2DSS to discovery them located in the unsynchronized cells each other.

Afterward, the eNB control unit 1105 determines whether it is allowed for only the RRC_Connected UE or both the RRC_Connected and RRC_Idle UEs to transmit the D2DSS. The D2DSS Tx UEs recorded in the eNB memory 1109, as illustrated in FIG. 11, may be determined by the operator. It may be configured dynamically when the operator installs the eNB or based on the information provided by a higher level network entity.

If only the RRC_Connected UE is allowed to transmit the D2DSS at operation 1304, the procedure goes to operation 1308 and, otherwise if both the RRC_Connected and RRC_Idle UEs are allowed to transmit the D2DSS, the procedure goes to operation 1306. At operation 1306, the eNB control unit 1105 controls the eNB data processing unit 1103, as illustrated in FIG. 11, and the eNB radio communication unit 1101, as illustrated in FIG. 11, to transmit a command such that both the RRC_Connected and RRC_Idle UEs transmit the D2DSS. Since this command transmission scheme has been described above, detailed description thereof is omitted herein.

Meanwhile at operation 1308, i.e., if both the RRC_Connected and RRC_Idle UEs are allowed to transmit the D2DSS, the eNB control unit 1105 controls the eNB data processing unit 1103 and the eNB radio communication unit 1101 such that the eNB broadcast the RSRP threshold for D2DSS transmission condition.

Figure 14:
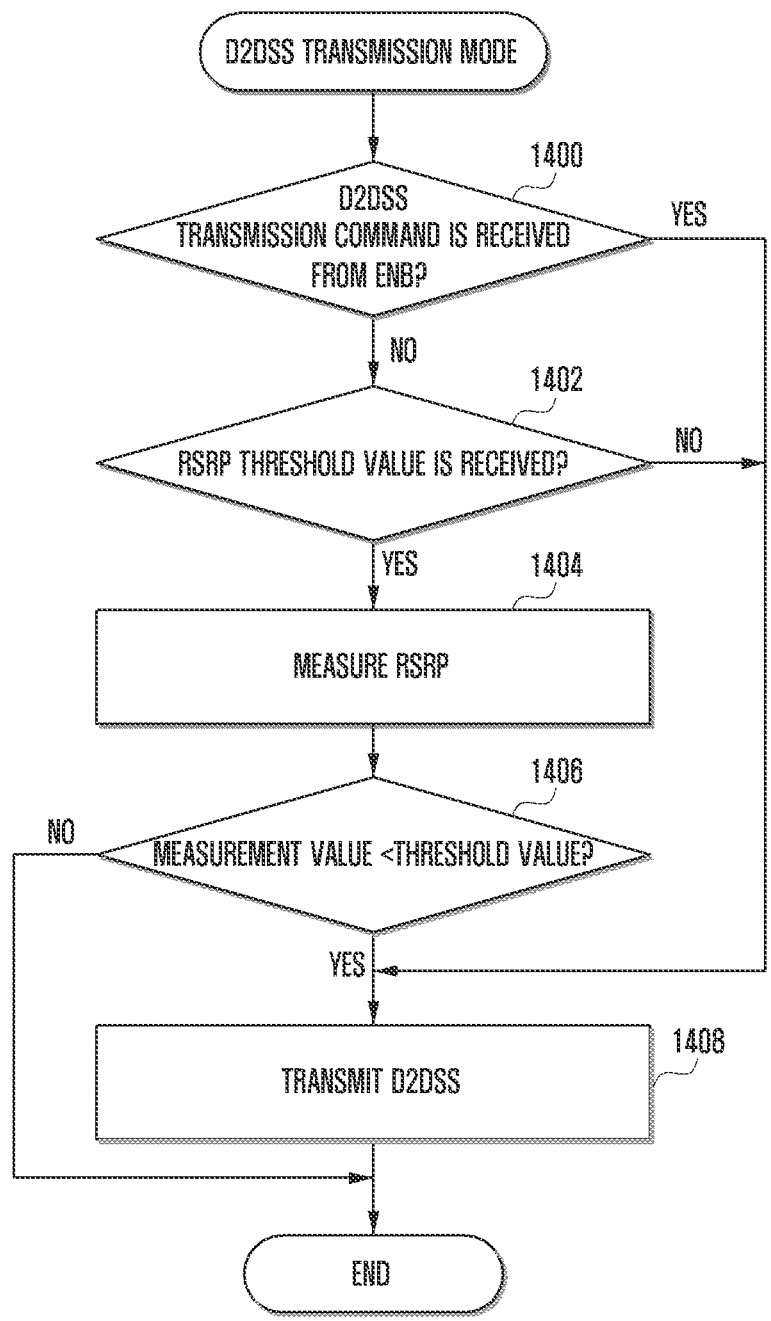
FIG. 14 is a flowchart illustrating a D2DSS transmission procedure of a UE according to an embodiment of the present disclosure.

FIG. 14 is a flowchart illustrating a D2DSS transmission procedure of a UE according to an embodiment of the present disclosure.

Referring to FIG. 14, a flowchart is illustrated, where the UE control unit 1205, as illustrated in FIG. 12, may know whether it is operating in the RRC_Connected state or RRC_Idle state. In a case of the UE in the RRC_Connected state, the UE control unit 1205 may receive the D2DSS transmission command from the eNB through dedicated RRC signaling by means of the UE radio communication unit 1201, as illustrated in FIG. 12, and the UE data processing unit 1203, as illustrated in FIG. 12. The control flow of FIG. 14 starts with the step of determining whether the D2DSS transmission command is received.

If it is determined that a D2DSS transmission command is received at operation 1400, the UE control unit 1205 controls the UE radio communication unit 1201 and the UE data processing unit 1203 to transmit a D2DSS at operation 1408.

If it is determined that no D2DSS transmission command is received at operation 1400, the UE determines whether an RSRP threshold is received from the eNB at operation 1402. As described above, the RSRP threshold may be a condition for determining whether to transmit the D2DSS. That is, the UE which is in a non-RRC_Connected state, i.e., RRC_Idle state, or which is in the RRC_Connected state but have not received the D2DSS transmission command determines whether the RSRP threshold for use in determining D2DSS transmission is received through a SIB at operation 1402.

If it is determined that the RSRP threshold is received through a SIB at operation 1402, the UE control unit 1205 measures RSRP from the eNB at operation 1404. At this time, the RSRP may be measured newly for D2DSS transmission or may be the value measured already in the cellular mode for cellular communication of the D2D UE, e.g., uplink transmit power control. That is, the RSRP may be a value measured after operation 1402 or measured already for other purposes before operation 1402. If it is determined that the RSRP threshold value is not received at operation 1402, the UE control unit 1205 controls the UE radio communication unit 1201 and the UE data processing unit 1203 to transmit a D2DSS at operation 1408.

Next, the UE control unit 1205 compares the measured RSRP value with the RSRP threshold received through the SIB at operation 1406. If the RSRP measurement value is less than the RSRP threshold, the procedure goes to operation 1408 and, otherwise if the RSRP measurement value is equal to or greater than the RSRP threshold, the procedure ends without D2DSS transmission.

Figure 15:
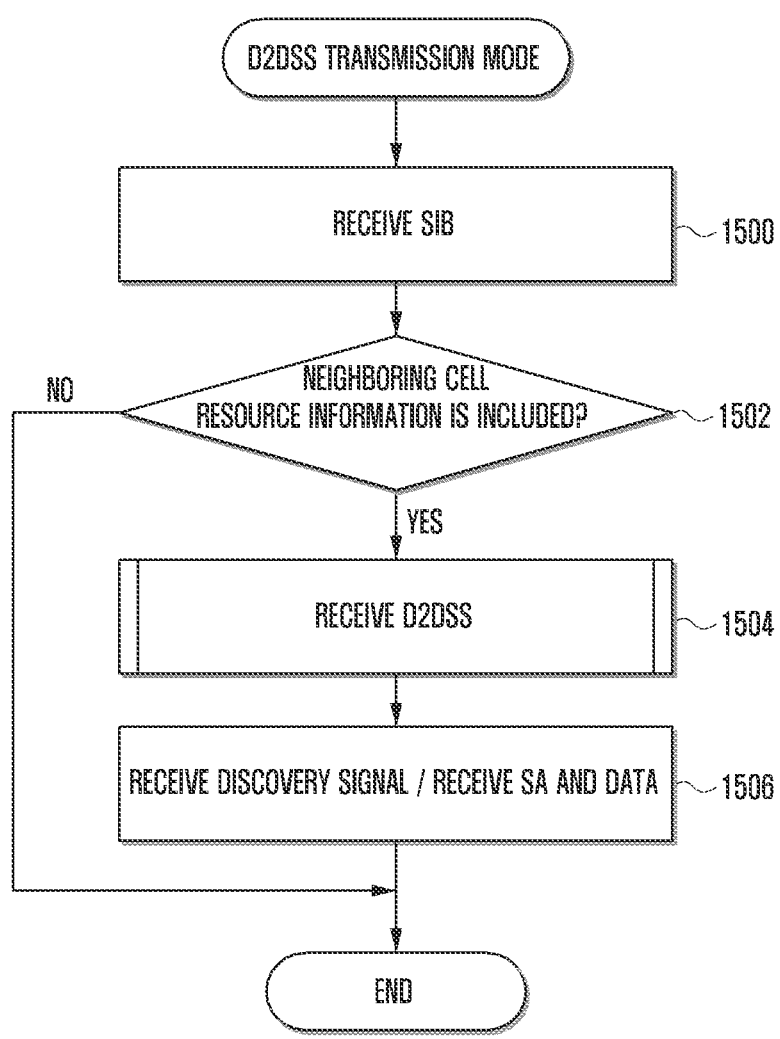
FIG. 15 is a flowchart illustrating a signal reception procedure of a UE for receiving a D2D discovery, a control signal or data from another UE located in a neighboring cell according to an embodiment of the present disclosure.

FIG. 15 is a flowchart illustrating a signal reception procedure of a UE for receiving a D2D discovery, a control signal or data from another UE located in a neighboring cell according to an embodiment of the present disclosure.

Referring to FIG. 15, a flowchart is illustrated, where the UE control unit 1205, as illustrated in FIG. 12, receives an SIB from a serving cell, i.e., eNB (or cell) to which it is connected at operation 1500. The UE control unit 1205 may acquire the information on the resource for receiving the discovery signal from the neighboring cell or control information (SA)/data information from the SIB. At this time, the SIB may include an identifier (ID) of the D2DSS transmitted from the neighboring cell as well as the D2D resource information of the neighboring cell.

At operation 1502, the UE control unit 1205 determines whether the received SIB includes the neighboring cell resource information at operation 1500. If the SIB includes the neighboring cell resource information at operation 1502, the UE control unit 1205 may receive the D2DSS based on this information at operation 1504. If the D2DSS is received, this means that the aforementioned condition is fulfilled. That is, the UE is in the range capable of performing D2D communication with a UE located in a neighboring cell. If the SIB does not include the neighboring cell resource information at operation 1502, the UE control unit 1205 ends the procedure.

Afterward, if the D2DSS is received at operation 1504, the UE control unit 1205 may acquire synchronization using the D2DSS transmitted by the D2D UE located in the neighboring cell. If the UE acquires synchronization with the D2D UE of the neighboring cell in this way, the UE control unit 1205 determines the start point of the subframe based on the D2DSS and receives at least one of the discovery signal or control or data information transmitted by the D2D UE of the neighboring cell in subsequence to the D2DSS subframe at operation 1506.

In an asynchronous network, it is necessary for the UEs to acquire subframe boundary timing of the neighboring cell by transmitting and receiving D2DSS to support D2D operation between D2D UEs located in different cells. The present disclosure is advantageous in that the D2D Rx UE to operates efficiently by specifying the operation of the D2D Rx UE.

Various aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), CD-ROMs, magnetic tapes, floppy disks, and optical data storage devices. The non-transitory computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for transmitting synchronization signal (SS) of device-to-device communication in a user equipment (UE), the method comprising:
   receiving, from a base station, configuration information including information indicating whether the UE to transmit synchronization information for the device-to-device communication;
   receiving, from the base station, a threshold value associated with the SS of the device-to-device communication;
   transmitting the SS of the device-to-device communication, in case that the information indicates transmission of the synchronization information for the device-to-device communication, and the UE is a radio resource control (RRC) connected state; and
   transmitting the SS of the device-to-device communication, in case that the information is not configured by the configuration information, and a reference signal received power (RSRP) measurement is below the threshold value.

2. The method of claim 1, further comprising:
   receiving, from the base station, a transmission power parameter of the SS of the device-to-device communication.

3. The method of claim 2, wherein the transmission power parameter is included in the configuration information.

4. The method of claim 3, wherein the transmission power parameter is set as a maximum transmission power of the UE.

5. The method of claim 1, wherein the threshold value is received via a system information block (SIB) from the base station.

6. The method of claim 1, further comprising:
   identifying whether the UE is in the RRC connected state.

7. The method of claim 1, wherein the threshold value is received from the base station via a system information block (SIB) in case that the UE is RRC connected state.

8. A user equipment (UE) for transmitting synchronization signal (SS) of device-to-device communication, the UE comprising:
   a transceiver configured to transmit and receive data to and from a base station, and to transmit and receive data and the SS of the device-to-device communication to and from a neighboring UE capable of device-to-device communication; and
   a processor configured to:
      control the transceiver to receive, from a base station, configuration information including information indicating whether the UE to transmit synchronization information for the device-to-device communication,
      control the transceiver to receive, from a base station, a threshold value associated with the SS of the device-to-device communication,
      control the transceiver to transmit the SS of the device-to-device communication in case that the information indicates transmission of the synchronization information for the device-to-device communication, and the UE is a radio resource control (RRC) connected state, and
      control the transceiver to transmit the SS of the device-to-device communication in case that the information is not configured by the configuration information, and a reference signal received power (RSRP) measurement is below the threshold value.

9. The UE of claim 8, wherein the processor is further configured to receive, from the base station, a transmission power parameter of the SS of the device-to-device communication.

10. The UE of claim 9, wherein the transmission power parameter is included in the configuration information.

11. The UE of claim 9, wherein the transmission power parameter is set as a maximum transmission power of the UE.

12. The UE of claim 8, wherein the processor is further configured to receive the threshold value via a system information block (SIB) from the base station.

13. The UE of claim 8, wherein the processor is further configured to identify whether the UE is in the RRC connected state.

14. The UE of claim 8, wherein the processor is further configured to receive the threshold value from the base station via a system information block (SIB) in case that the UE is RRC connected state.

* * * * *